United States Patent
Malvino

(10) Patent No.: US 6,897,997 B2
(45) Date of Patent: May 24, 2005

(54) METHOD AND DEVICE FOR CONTROLLING VOLTAGE PROVIDED TO A SUSPENDED PARTICLE DEVICE

(75) Inventor: Albert P. Malvino, Corpus Christi, TX (US)

(73) Assignee: Research Frontiers Incorporated, Woodbury, NY (US)

( * ) Notice: Subject to any disclaimer, the term of this patent is extended or adjusted under 35 U.S.C. 154(b) by 0 days.

(21) Appl. No.: 10/774,930

(22) Filed: Feb. 9, 2004

(65) Prior Publication Data

US 2004/0160660 A1 Aug. 19, 2004

Related U.S. Application Data

(63) Continuation-in-part of application No. 10/366,276, filed on Feb. 13, 2003, now Pat. No. 6,804,040.

(51) Int. Cl.[7] .............................................. G02B 26/00
(52) U.S. Cl. ........................................................ 359/296
(58) Field of Search ................................ 359/245, 290, 359/296; 345/105, 107, 108; 252/585

(56) References Cited

U.S. PATENT DOCUMENTS

| | | | |
|---|---|---|---|
| 4,247,175 A | 1/1981 | Saxe | 359/296 |
| 4,407,565 A | 10/1983 | Saxe | 359/296 |
| 4,877,313 A | 10/1989 | Saxe et al. | 359/253 |
| 5,002,701 A | 3/1991 | Saxe | 252/586 |
| 5,093,041 A | 3/1992 | Check, III et al. | 252/585 |
| 5,409,734 A | 4/1995 | Lee et al. | 427/163.1 |
| 5,463,491 A | 10/1995 | Check, III | 359/296 |
| 5,463,492 A | 10/1995 | Check, III | 359/296 |
| 5,516,463 A | 5/1996 | Check, III et al. | 252/585 |
| 5,764,402 A | 6/1998 | Thomas et al. | 359/272 |
| 6,529,312 B1 * | 3/2003 | Saxe | 359/296 |
| 2002/0040851 A1 * | 4/2002 | Mc.Neil-Watson et al. | 204/549 |

* cited by examiner

Primary Examiner—Georgia Epps
Assistant Examiner—M. Hasan
(74) Attorney, Agent, or Firm—Ostrolenk, Faber, Gerb & Soffen, LLP

(57) ABSTRACT

A voltage controlling device includes an AC terminal receiving an AC voltage signal, a voltage dividing device adapted to divide the AC voltage signal into a plurality of distinct voltage signals within a predetermined range, a controller adapted to control the voltage dividing device to provide a selected voltage level based on voltage level information and an SPD terminal for providing the selected voltage level to a suspended particle device. Voltage level information may be provided via an input device and/or from a photocell that monitors a light level at the suspended particle device. A separate AC power supply may also be provided. The controller may also monitor an SPD load voltage to control the voltage level provided to the SPD terminal in order to prevent shocking of a user.

42 Claims, 19 Drawing Sheets

| READINGS | | EFFECTS |
|---|---|---|
| SAFE CURRENT VALUES | 1 mA OR LESS | CAUSES NO SENSATION – NOT FELT. |
| | 1 mA TO 8 mA | SENSATION OF SHOCK, NOT PAINFUL; INDIVIDUAL CAN LET GO AT WILL SINCE MUSCULAR CONTROL IS NOT LOST. |
| UNSAFE CURRENT VALUES | 8 mA TO 15 mA | PAINFUL SHOCK; INDIVIDUAL CAN LET GO AT WILL SINCE MUSCULAR CONTROL IS NOT LOST. |
| | 15 mA TO 20 mA | PAINFUL SHOCK; CONTROL OF ADJACENT MUSCLES LOST; VICTIM CAN NOT LET GO. |
| | 50 mA TO 100 mA | VENTRICULAR FIBRILLATION – A HEART CONDITION THAT CAN RESULT IN DEATH – IS POSSIBLE. |
| | 100 mA TO 200 mA | VENTRICULAR FIBRILLATION OCCURS. |
| | 200 mA AND OVER | SEVERE BURNS, SEVERE MUSCULAR CONTRACTIONS – SO SEVERE THAT CHEST MUSCLES CLAMP THE HEART AND STOP IT FOR THE DURATION OF THE SHOCK. (THIS PREVENTS VENTRICULAR FIBRILLATION). |

FIG.9

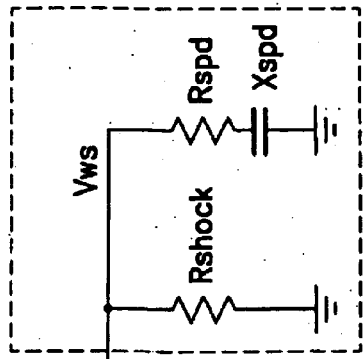
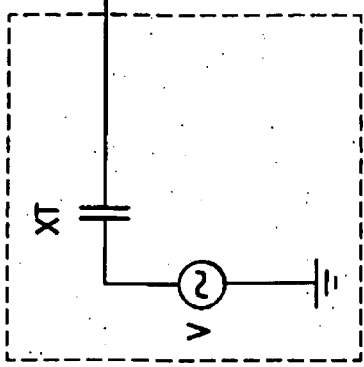
FIG.10
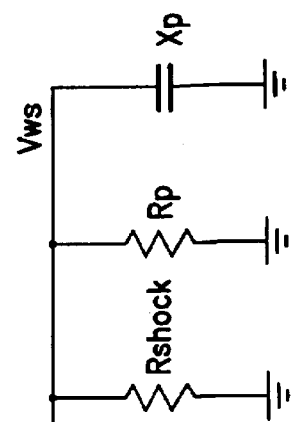
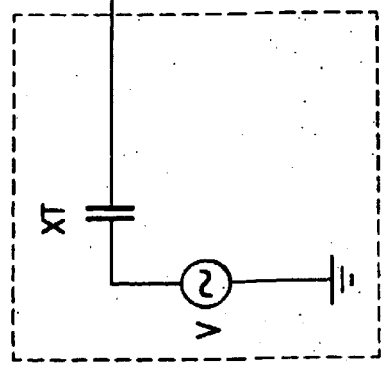
FIG.11

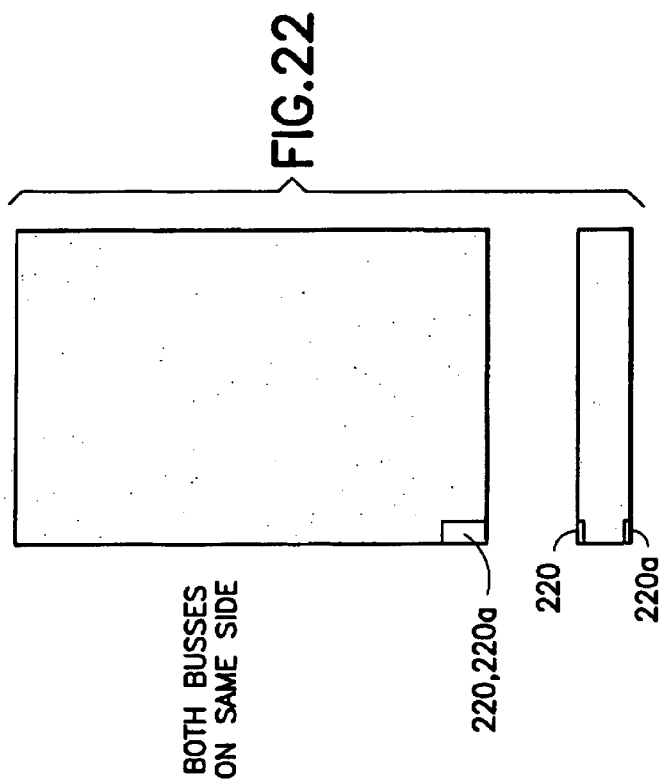
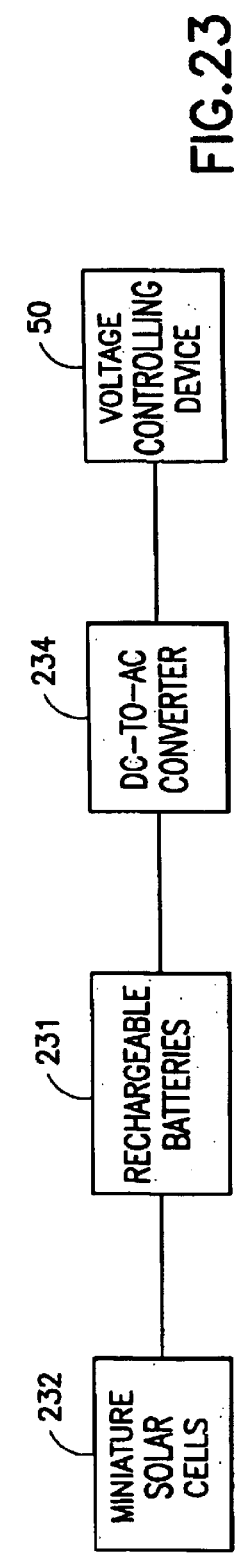

METHOD AND DEVICE FOR CONTROLLING VOLTAGE PROVIDED TO A SUSPENDED PARTICLE DEVICE

This application is a continuation-in-part of and claims the benefit of U.S. application Ser. No. 10/366,276 filed Feb. 13, 2003 now U.S. Pat. No. 6,804,040, the contents of which are hereby incorporated by reference.

FIELD OF THE INVENTION

The invention relates to a power-efficient and low-cost method and device for controlling an AC voltage applied to a suspended particle device (SPD). The invention also relates to methods and devices for shock prevention, detecting forced entry, and reducing the manufacturing costs of SPD film. The invention further relates to methods and devices for optimizing control of an AC voltage applied to a suspended particle device.

BACKGROUND OF THE INVENTION

Light valves have been in use for more than sixty years for the modulation of light. As used herein, a light valve is defined as a cell formed of two walls that are spaced apart by a small distance, at least one wall being transparent, the walls having electrodes thereon, usually in the form of transparent, electrically conductive coatings. The cell contains a light-modulating element (sometimes herein referred to as an "activatable material"), which may be either a liquid suspension of particles, or a plastic film in which droplets of a liquid suspension of particles are distributed.

The liquid suspension (sometimes herein referred to as "a liquid light valve suspension" or "a light valve suspension") comprises small, anisometrically shaped particles suspended in a liquid suspending medium. In the absence of an applied electrical field, the particles in the liquid suspension assume random positions due to Brownian movement, and hence a beam of light passing into the cell is reflected, transmitted or absorbed, depending upon the cell structure, the nature and concentration of the particles, and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state. Light valves of the type described herein are also known as "suspended particle devices" or "SPDs." More generally, the term suspended particle device, as used herein, refers to any device in which suspended particles align to allow light to pass through the device when an electric field is applied.

Light valves have been proposed for use in numerous applications including, e.g., alphanumeric and graphic displays; television displays; filters for lamps, cameras, optical fibers, and windows, sunroofs, sunvisors, eyeglasses, goggles and mirrors and the like, to control the amount of light passing therethrough or reflected therefrom as the case may be. As used herein the term "light" generally refers to visible electromagnetic radiation, but where applicable, "light" can also comprise other types of electromagnetic radiation such as, but not limited to, infrared radiation and ultraviolet radiation.

For many applications, as would be well understood in the art it is preferable for the activatable material, i.e., the light modulating element, to be a plastic film rather than a liquid suspension. For example, in a light valve used as a variable light transmission window, a plastic film, in which droplets of liquid suspension are distributed, is preferable to a liquid suspension alone because hydrostatic pressure effects, e.g., bulging, associated with a high column of liquid suspension, can be avoided through use of a film, and the risk of possible leakage can also be avoided. Another advantage of using a plastic film is that in a plastic film, the particles are generally present only within very small droplets, and hence do not noticeably agglomerate when the film is repeatedly activated with a voltage.

As used herein, the terms "SPD film" or "light valve film" mean at least one film or sheet comprising a suspension of particles used or intended for use by itself or as part of a light valve. The light valve film or SPD film includes either: (a) a suspension of particles dispersed throughout a continuous liquid phase enclosed within one or more rigid or flexible solid films or sheets, or (b) a discontinuous phase of a liquid comprising dispersed particles, the discontinuous phase being dispersed throughout a continuous phase of a rigid or flexible solid film or sheet. The light valve film or SPD film may also include one or more other layers such as, without limitation, a film, coating or sheet, or combination thereof, which may provide the light valve film or SPD film with (1) scratch resistance (2) protection from ultraviolet radiation (3) reflection of infrared energy, and/or (4) electrical conductivity for transmitting an applied electric or magnetic field to the activatable material.

U.S. Pat. No. 5,409,734 illustrates an example of a type of light valve film that is formed by phase separation from a homogeneous solution. Light valve films may be made by cross-linking emulsions such as those described in U.S. Pat. Nos. 5,463,491 and 5,463,492, both of which are assigned to the assignee of the present invention.

The following is a brief description of liquid light valve suspensions known in the art, although the invention is not limited to the use of only such suspensions.

1. Liquid Suspending Media and Stabilizers

A liquid light valve suspension for use with the invention may be any liquid light valve suspension known in the art and may be formulated according to techniques well known to one skilled in the art. The term "liquid light valve suspension", as used herein, means a "liquid suspending medium" in which a plurality of small particles is dispersed. The "liquid suspending medium" includes one or more non-aqueous, electrically resistive liquids in which there is preferably dissolved at least one type of polymeric stabilizer, which acts to reduce the tendency of the particles to agglomerate and to keep them dispersed and in suspension.

Liquid light valve suspensions useful in the present invention may include any of the liquid suspending media previously proposed for use in light valves for suspending the particles. Liquid suspending media known in the art which are useful herein include, but are not limited to the liquid suspending media disclosed in U.S. Pat. Nos. 4,247,175 and 4,407,565. In general, the at least one liquid suspending medium and the polymeric stabilizer dissolved therein is chosen in a manner known in the art so as to maintain the suspended particles in gravitational equilibrium.

The polymeric stabilizer, when employed, can be a single solid polymer that bonds to the surface of the particles, but which also dissolves in the non-aqueous liquid or liquids of the liquid suspending medium. Alternatively, two or more solid polymeric stabilizers may serve as a polymeric stabilizer system. For example, the particles can be coated with a first type of solid polymeric stabilizer such as nitrocellulose which, in effect, provides a plain surface coating for the particles, after which they are re-coated with one or more additional types of solid polymeric stabilizer that bond to or associate with the first type of solid polymeric stabilizer and which also dissolve in the liquid suspending medium to provide dispersion and steric protection for the particles. Also, liquid polymeric stabilizers may be used to advantage, especially in SPD light valve films, as described in U.S. Pat. No. 5,463,492.

2. Particles

Inorganic and organic particles may be incorporated into a light valve suspension useful in forming a switchable suspended particle device. Such particles may be either light-absorbing or light-reflecting in the visible portion of the electromagnetic spectrum. For some particular applications the particles can be reflective at infrared wavelengths.

Conventional SPD light valves have generally employed polyhalide particles of colloidal size, that is the particles generally have a largest dimension averaging about 1 micron or less. As used herein, the term "colloidal", when referring to particle size, shall have the meaning given in the preceding sentence. Preferably, most polyhalide or other particles used or intended for use in an SPD light valve suspension used in accordance with the invention will have a largest dimension which averages less than one-half of the wavelength of blue light, i.e., less than 2000 Angstroms, to keep light scatter extremely low. As used herein, the term "anisometric", which refers to particle shape, means that at least one dimension (i.e., length, width, thickness) is larger than another. Typically, anisometric particles (sometimes referred to as particles which are anisometrically shaped), are desirable in an SPD light valve suspension so that the particles will block less light when the suspension is activated than when it is unactivated. For some suspensions the reverse is true, however. Desirable anisometric shapes for the particles include, without limitation thereto, particles shaped like rods, cylinders, plates, flakes, needles, blades, prisms, and other shapes known in the art.

A detailed review of prior art polyhalide particles is found in "The Optical Properties and Structure of Polyiodides" by D. A. Godina and G. P. Faerman, published in "The Journal of General Chemistry", U.S.S.R. Vol. 20, pp. 1005–1016 (1950).

Herapathite, for example, is defined as a quinine bisulfate polyiodide, and its formula is given under the heading "quinine iodsulfate" as $4C_{20}H_{24}N_2O_2.3H_2SO_4.2HI.I_4.6H_2O$ in The Merck Index, $10^{th}$ Ed. (Merck & Co., Inc., Rahway, N.J.). In polyiodide compounds, the iodide anion is thought to form chains and the compounds are strong light polarizers. See U.S. Pat. No. 4,877,313 and Teitelbaum et al. JACS 100 (1978), pp. 3215–3217. The term "polyhalide" is used herein to mean a compound such as a polyiodide, but wherein at least some of the iodide anion may be replaced by another halide anion. More recently, improved polyhalide particles for use in light valves have been proposed in U.S. Pat. Nos. 4,877,313, 5,002,701, 5,093,041 and 5,516,463. These "polyhalide particles" are formed by reacting organic compounds, usually containing nitrogen, with elemental iodine and a hydrohalide acid or an ammonium halide, alkali metal halide or alkaline earth metal halide.

For some applications, however, it may be desirable to use non-polyhalide particles in light valve suspensions and films, especially where the stability of the material composing the particles is known to be excellent. Regardless of the type of suspended particle device used, it is necessary to have a method and/or means of producing and varying the AC voltage applied to the suspended particle device, or SPD load, from 0V to a maximum voltage that is acceptable for the specific SPD application. For the purposes of the present disclosure the term SPD load includes SPD films, SPD light valves, and all other SPD products that rely on the application of an electric field to control the orientation of suspended particles. Where the SPD load utilizes an SPD film, the voltage that produces maximum light transmission in the SPD load is a function of SPD film thickness and other properties. Since the light transmission of the SPD load is a nonlinear function of voltage, i.e., increasing rapidly at lower voltages and slowly at high voltages, a design compromise can be made by defining a maximum acceptable voltage which provides a sufficiently clear state of the SPD load, currently in the 30 to 60 V rms region. In this discussion, 60 V rms will be used as the AC voltage that produces an acceptable clear state with the understanding the newer SPD films may be developed that produce an almost clear state with less than 30 V rms.

Although providing a maximum voltage of 0 to 60 V rms is suitable for most SPD loads, the SPD load current shows a large variation because of all the possible configurations and sizes of SPD loads. For instance, a single SPD window can vary in size from as little as 1 square foot to as much as 32 square feet or more. In addition, multiple panels of 8 ft×4 ft windows or larger can aggregate hundreds or even thousands of square feet. For these larger SPD loads, there are advantages in generating the AC voltage for the SPD loads, which will be discussed in further detail below. Furthermore, the busses (also known as bus bars) through which electricity is supplied to the SPD loads may be optimized to reduce their manufacturing costs. All of these improvements contribute to a highly efficient and minimum cost system for controlling voltages across SPD loads.

Unless otherwise indicated, the following will be assumed throughout this discussion:

Voltage for almost clear state=60 V rms at 60 Hz

Capacitance per square foot=40 nF (of the SPD film)

Resistance per square=350 ohms (of the SPD film)

Based on the foregoing assumptions, a voltage controller for an SPD load preferably delivers a load current of 0.905 mA for an SPD load of 1 square foot up to 28.8 mA for an SPD load of 32 square feet. As a conservative approximation, 1 mA per square foot will be used as a guideline. For instance, an office building with 40 panels of 8 ft by 4 ft windows has a film area of 1280 square feet. In such a case, the current demand is approximately 1.28 A at 60 V and 60 Hz to attain an almost clear state for all the windows. Although future developments in SPD film may alter the voltage-current-power requirements of SPD film, the voltage controlling device of the present application will accommodate a wide range of film characteristics.

Currently existing voltage controlling devices commonly use a transformer and/or potentiometer to provide and vary the AC voltage provided to the SPD load. Transformers can be used to step down voltages if desired, while potentiometers allow for variations of voltages through a range of values. Transformers, however, tend to be rather expensive and also reduce efficiency of the voltage controlling device due to coil losses and core losses inherent in the transformer.

One example of a currently existing voltage control device is described in U.S. Pat. No. 5,764,402 which relates to an optical cell control system that includes a first oscillator circuit supplied by a low voltage power source and including a primary winding of an induction coil and a secondary resonant circuit that includes the optical cell and a secondary winding of the induction coil. The second circuit includes the inductance of the secondary winding and the optical cell. The induction coil provides a weak coupling between the primary and secondary windings. The resonant circuit provides a large over-voltage coefficient and good stability.

One problem encountered in traditional voltage controlling devices is that potentiometers provide a continuous range of voltage values between a minimum value and a maximum value such that a slight adjustment to the potentiometer results in a slight change in voltage applied to the SPD load and a corresponding slight increase in the clarity of the SPD load. Since potentiometers are resistive circuit elements, power losses in potentiometers tend to be rather high. In addition, the fine control provided by the potentiometer is unnecessary in an SPD application. The human eye is not able to detect slight variations in clarity of the SPD load, thus the continuous range of voltages provided by the potentiometer which provide for minute increases in clarity of the SPD load are unnecessary. Thus, traditional voltage controlling devices are rather inefficient and provide little observable benefit in controlling clarity of the SPD load.

Safety is also a concern in the voltage controlling device. While SPD loads commonly use relatively small currents, even these small currents could be hazardous to a user who is exposed to them. For example, if an SPD window were to crack, the current conducting layer may be exposed. If one were to contact the exposed current conducting layer and inadvertently provide a path to ground, the individual may receive a shock. Traditional current controlling devices typically utilize a ground fault circuit interrupt (GFCI) which cuts off current to the SPD load if an unintended ground path develops. GFCI's, however tend to be somewhat expensive and may not guard against another shock risk in SPD loads. For example, where an SPD window is pierced by a sharp object, a user may inadvertently provide a path between the two conducting layers directly which may result in a shock to the user. Thus, it would be advantageous to provide a voltage controlling device which avoids these problems at a low cost.

In addition, as noted above, the light transmission of the SPD load is a nonlinear function of voltage, i.e., increasing rapidly at lower voltages and slowly at high voltages. Thus, small manual adjustments using input device result in large changes in the SPD voltage which result in large changes in the light transmission of the SPD. This issue is compounded based on the area of the SPD which relates to the capacitance of the SPD and contributes to the nonlinear response of light transmission to SPD voltage. While adjustments can be made to linearize the response for a particular SPD, it is advantageous for the controller to have a more universal application such that it will operate effectively for SPDs of varying sizes. Thus, it would be useful to provide a control method and device that automatically measures the area of the SPD. After the SPD area has been measured at power-up, for example, this information can be used to produce a linear or otherwise optimized response with respect to a manual adjustment. That is to correlate the change in SPD voltage in a more linear fashion to the manual adjustments of the user.

Similarly, it is advantageous to provide a control method and device that will optimize this relationship not only for present SPD material, but that will be adaptable for use with future SPD films for example. The response profiles of future films may be input into the voltage controlling device used to optimize control of SPDs using these new films.

In addition, further to the above discussion concerning the shock danger for users of SPD devices, the danger of excessive current to the components of the voltage controlling the device itself must also be considered. That is, the components of the voltage controlling device itself may be damaged by excessive currents, even where those currents do not pose a threat to users. Thus, it would be advantageous to provide a method and device to control voltage that also monitors the current in the control device and prevents an excessive current from damaging the controller.

Finally, it would be advantageous to provide a voltage controlling device that may be used to monitor and control other controllers such that numerous SPD loads can be controlled by a single controller.

Therefore, it is desirable to provide a voltage controlling method and device that provide efficient, optimized and low cost voltage control while avoiding the problems discussed above.

SUMMARY OF THE INVENTION

A voltage controlling device for controlling voltage provided to at least one suspended particle device (SPD) includes an AC terminal adapted to receive an AC voltage at a specific frequency, a voltage dividing device adapted to divide the AC voltage into a plurality of distinct voltage values within a predetermined range, a measurement device adapted to provide measurement information related to the surface area of the SPD, a controller adapted to control the voltage dividing device to provide a selected voltage value based on voltage level information and the measurement information and an SPD terminal adapted to provide the selected voltage value to the SPD.

The voltage dividing device may include a capacitor array including a plurality of capacitors where each capacitor in the capacitor array has a predetermined capacitance and a switch array, connecting each capacitor of the capacitor array to the SPD terminal such that each switch of the switch array connects one capacitor of the capacitor array to the SPD terminal, wherein the controller controls the switches of the switch array to connect at least one of the capacitors of the capacitor array to the SPD terminal based on the voltage level information and the measurement information.

The voltage controlling device may include an input device adapted to allow a user to input and adjust the voltage level information.

The measurement device may be connected electrically in series with the SPD terminal. The measurement device may include a current sensing resistor providing voltage drop information regarding a voltage drop across the current sensing resistor. The controller may determine the surface area of the SPD based on the voltage drop information.

The controller may store information related to a relationship between adjustments of the voltage level information made via the input device and the selected voltage level for SPDs having a plurality of different surface areas.

The controller may optimize the relationship between the adjustments of the voltage level information made via the input device and the selected voltage level provided to the SPD terminal based on the determined surface area of the SPD.

The controller may linearize the relationship between the adjustments made via the voltage level information and the selected voltage level provided to the SPD terminal such that as the user adjusts the voltage level information via the input device, the selected voltage level supplied to the SPD terminal changes in a substantially linear fashion.

The controller may receive the measurement information from at least one slave voltage controlling device and provides control information to a slave controller of the slave voltage controlling device based on the voltage level information and the measurement information from the slave voltage controlling device.

The controller may store relationship information regarding the relationship between adjustments made to the voltage level information made by the user via the input device and the selected voltage supplied to the SPD terminal for a plurality of different types of SPDs.

The controller may optimize the relationship between adjustments made to the voltage level information made by the user via the input device and the selected voltage supplied to the SPD terminal based on selection information indicating an SPD type. The selection information may be provided by the user utilizing a selection device. The selection device may be set in advance utilizing the selection device.

The controller may control the switch array to disconnect at least one capacitor of the capacitor array from the SPD terminal when the voltage drop information indicates that the voltage drop across the current sensing resistor is above a predetermined level.

The controller may reconnect the at least one capacitor of the capacitor array to the SPD terminal after a predetermined period of time has passed. The controller may reconnect the at least one capacitor of the capacitor array to the SPD terminal when the voltage drop information indicates that the voltage drop across the current sensing resistor is below the predetermined level. The controller may receive the measurement information from at least one slave voltage controlling device and provides control information to a slave controller of the slave voltage controlling device based on the voltage level information and the measurement information from the slave voltage controlling device.

A method of controlling voltage provided to a suspended particle device (SPD) includes receiving an AC voltage at a specific frequency, dividing the AC voltage into a plurality of distinct voltage values within a predetermined range using a voltage dividing device, determining measurement information related to the surface area of the SPD using a measurement device, controlling the voltage dividing device to provide a selected voltage value based on voltage level information and the measurement information and providing the selected voltage value to an SPD terminal connected to the SPD.

The dividing step may include providing a capacitor array including a plurality of capacitors, where each capacitor in the capacitor array has a predetermined capacitance and connecting each capacitor of the capacitor array to the SPD terminal via a switch array, such that each switch of the switch array connects one capacitor of the capacitor array to the SPD terminal, wherein the switch array is controlled such that switches of the switch array connect at least one of the capacitors of the capacitor array to the SPD terminal based on voltage level information and the measurement information.

The method may further include allowing a user to input and adjust the voltage level information utilizing an input device.

The measurement device may be connected electrically in series with the SPD terminal. The method may include receiving voltage drop information from a current sensing resistor of the measurement device, where the voltage drop information indicates a voltage drop across the current sensing resistor. The controlling step may further include calculating a surface area of the SPD based on the voltage drop information.

The controlling step may further include storing relationship information related to a relationship between adjustment of the voltage level information made via the input device and the selected voltage level provided to the SPD terminal for SPDs having a plurality of different surface areas.

The controlling step may further include optimizing the relationship between the adjustment of the voltage level information made via the input device and the selected voltage level provided to the SPD terminal based on the determined surface area of the SPD.

The controlling step may include linearizing the relationship between the adjustment made via the voltage level information and the selected voltage level provided to the SPD terminal, such that, as the user adjusts the voltage level information via the input device, the selected voltage level supplied to the SPD terminal changes in a substantially linear fashion.

The controlling step may include receiving measurement information from at least one slave voltage controlling device and providing control information to a slave controller of the slave voltage controlling device based on the voltage level information and the measurement information from the slave voltage controlling device.

The controlling step may also include storing relationship information regarding the relationship between adjustment of the voltage level information made by the user via the input device and the selected voltage supplied to the SPD terminal for a plurality of different types of SPDs and optimizing the relationship between adjustment to the voltage level information made by the user via the input device and the selected voltage supplied to the SPD terminal based on selection information indicating an SPD type. The selection information may be provided by the user utilizing a selection device. The selection information may be provided in advance and stored.

The controlling step may include disconnecting at least one capacitor of the capacitor array from the SPD terminal when the voltage drop information indicates that the voltage drop across the current sensing resistor is above a predetermined level.

The controlling step may further include reconnecting the at least one capacitor of the capacitor array to the SPD terminal after a predetermined period of time has passed. The controlling step may include reconnecting the at least one capacitor of the capacitor array to the SPD terminal when the voltage drop information indicates that the voltage drop across the current sensing resistor is below the predetermined level. The controlling step may also include receiving measurement information from at least one slave voltage controlling device and providing control information to a slave controller of the slave voltage controlling device based on the voltage level information and the measurement information from the slave voltage controlling device.

A voltage controlling device for controlling voltage provided to at least one suspended particle device (SPD) includes an AC terminal adapted to receive an AC voltage at a specific frequency, a voltage dividing device adapted to divide the AC voltage into a plurality of distinct voltage values within a predetermined range, a measurement device adapted to provide measurement information related to the surface area of the SPD, a controller adapted to control the voltage dividing device to provide a selected voltage value based on voltage level information and the measurement information, wherein the controller optimizes a relationship between adjustments to the voltage level information and the selected voltage value and an SPD terminal adapted to provide the selected voltage value to the SPD.

A method of controlling voltage provided to a suspended particle device (SPD) includes receiving an AC voltage at a specific frequency, dividing the AC voltage into a plurality of distinct voltage values within a predetermined range using a voltage dividing device, determining measurement information related to the surface area of the SPD using a measurement device, controlling the voltage dividing device to provide a selected voltage value based on voltage level information and the measurement information and optimizing a relationship between adjustments made to the voltage level information and the selected voltage value and providing the selected voltage value to an SPD terminal connected to the SPD.

A voltage controlling device for controlling voltage provided to at least one suspended particle device (SPD) includes an AC terminal adapted to receive an AC voltage at a specific frequency, a voltage dividing device adapted to divide the AC voltage into a plurality of distinct voltage values within a predetermined range, a measurement device adapted to provide measurement information related to the surface area of the SPD, wherein the measurement device includes a current sensing resistor providing voltage drop information indicating a voltage drop across the current sensing resistor, a controller adapted to control the voltage dividing device to provide a selected voltage value based on voltage level information and the measurement information, wherein the controller controls the voltage dividing device to reduce the selected voltage value when the voltage drop information is above a predetermined level and an SPD terminal adapted to provide the selected voltage value to the SPD.

A method of controlling voltage provided to a suspended particle device (SPD) includes receiving an AC voltage at a specific frequency, dividing the AC voltage into a plurality of distinct voltage values within a predetermined range using a voltage dividing device, determining measurement information related to the surface area of the SPD using a measurement device and including voltage drop information indicating a voltage drop across a current sensing resistor, controlling the voltage dividing device to provide a selected voltage value based on voltage level information and the measurement information, wherein the selected voltage value is reduced when the voltage drop information is above a predetermined level and providing the selected voltage value to an SPD terminal connected to the SPD.

A voltage controlling device for controlling voltage provided to at least one suspended particle device (SPD) includes an AC terminal adapted to receive an AC voltage at a specific frequency, a voltage dividing device adapted to divide the AC voltage into a plurality of distinct voltage values within a predetermined range, a measurement device adapted to provide measurement information related to the surface area of the SPD, wherein the measurement device includes a current sensing resistor providing voltage drop information indicating a voltage drop across the current sensing resistor, a controller adapted to control the voltage dividing device to provide a selected voltage value based on voltage level information and the measurement information, wherein the controller optimizes a relationship between adjustments to the voltage level information and the selected voltage value, and further controls the voltage dividing device to reduce the selected voltage value when the voltage drop information is above a predetermined level and an SPD terminal adapted to provide the selected voltage value to the SPD.

A method of controlling voltage provided to a suspended particle device (SPD) includes receiving an AC voltage at a specific frequency, dividing the AC voltage into a plurality of distinct voltage values within a predetermined range using a voltage dividing device, determining measurement information related to the surface area of the SPD using a measurement device and including voltage drop information indicating a voltage drop across a current sensing resistor, controlling the voltage dividing device to provide a selected voltage value based on voltage level information and the measurement information, wherein a relationship between adjustments made to the voltage level information and the selected voltage value is optimized and wherein the selected voltage value is reduced when the voltage drop information is above a predetermined level and providing the selected voltage value to an SPD terminal connected to the SPD.

BRIEF DESCRIPTION OF DRAWINGS

FIG. 9 is a table showing the physiological effects of shock currents upon the human body;

FIG. 10 is a simplified AC equivalent circuit of a voltage controlling device driving an SPD load under shock conditions;

FIG. 11 is a modified equivalent circuit of FIG. 10 after the SPD load has been transformed from a series equivalent circuit to a parallel equivalent circuit;

FIG. 22 is a diagram illustrating the placement of conducting busses in an SPD load according to an embodiment of the present application;

FIG. 23 is a block diagram of an AC power supply according to an embodiment of the present application;

DETAILED DESCRIPTION OF THE INVENTION

Figure 1:
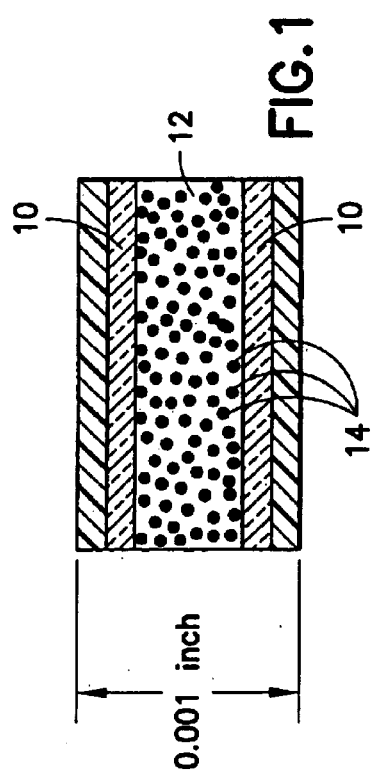
FIG. 1 is a cross-sectional view of an SPD film.

FIG. 1 illustrates an example of a typical SPD film. The two conducting layers 10 act like the two plates of a parallel-plate capacitor and the emulsion 12 acts like its dielectric. The small dots 14 represent cells (droplets) enclosing anisometrically shaped particles such as rod-shaped particles that change their orientation in the presence of an electric field. The capacitance of SPD film is given by Equation 1:

$$C_{spd} = \varepsilon \frac{A}{d} \qquad \text{Equation 1}$$

Where $\in$ is the permittivity of the emulsion 12, A is the area of one conducting layer 10 and d is the distance between the two conducting layers 10.

A voltage controlling device in accordance with the present invention enables one to control AC voltage applied to SPD loads in a novel, cost-effective, and safe manner. As used herein the term "SPD load" includes SPD films, SPD light valves, and all other SPD products that rely on the application of an electric field to control the orientation of suspended particles. When the electric field is zero, the suspended particles become randomly oriented because of Brownian movement, and this randomness has the effect of reducing or blocking the passage of light through the SPD load. Upon application of an electric field, the particles align, usually with their long axes parallel to the electric field, which allows light to pass through the SPD load.

Currently available SPD films utilize AC voltages up to 200 V rms to create a maximum clear state in the SPD load. However, much lower voltages can create an almost clear state. The value of acceptable voltage required for a clear state depends on the thickness of the dielectric layer, such as emulsion 12 of FIG. 1, between conducting layers, the dielectric constant of the SPD emulsion, and the nature of the SPD particles in the SPD emulsion. The function of an SPD voltage controller, therefore, is to produce an AC voltage between 0 and $V_{max}$, the voltage level that produces an acceptable level of clarity in the SPD load, for a given application. Unless otherwise indicated, this discussion uses 60 V rms as the acceptable value of $V_{max}$. It is noted that the value of 60 V rms is selected merely for convenience and that the voltage controlling device and methods of the present application are not limited to use with SPD devices in which 60 V rms provides an acceptable clear state in the SPD load. The voltage controlling method and device invention are further defined below with particular reference to the figures submitted herewith.

Typical SPD film has a capacitance of approximately 40 nF per square foot, although smaller and larger values may occur with future SPD films. This capacitance is one of the most important parameters of SPD film because it determines how much AC current is required by a given SPD load to produce an acceptably clear state.

Another important parameter of SPD film is the resistance of its conducting layers 10. These conducting layers 10 usually have a resistance between 200 and 500 ohms per square, but the resistance of a conducting layer may vary. This resistance is the main cause of $I^2R$ power dissipation in the SPD load. It can be shown that the power losses of an SPD load are Directly proportional to the square of the frequency of the AC voltage applied to the SPD load;

Directly proportional to the square of SPD load area;

Directly proportional to the square of SPD load voltage; and

Directly proportional to the resistance of the conducting layers.

Figure 3:
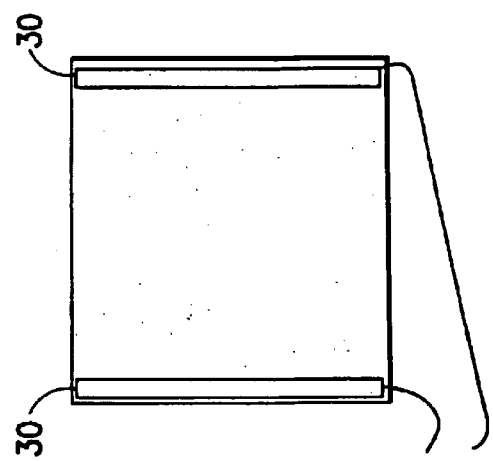
FIG. 3 is an example of a square piece of SPD film.
Figure 2:
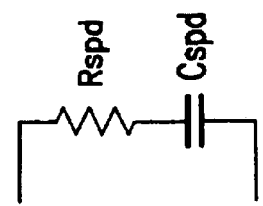
FIG. 2 is the series equivalent circuit of the SPD film of FIG. 1.

FIG. 2 shows an equivalent electrical circuit for SPD film. A window including the SPD film may be of any practical size. However, the size of individual SPD windows typically varies from as little as 1 square foot to as many as 32 square feet, and thus, the capacitance of the. SPD load varies over a 32-to-1 range. The resistance of the SPD load, on the other hand, has a much smaller variation, because its value depends at least in part on which edges of the conducting layers 10 are used for conducting (see FIG. 3). If the SPD load is square, the conducting busses 30 appear as shown in FIG. 3, for example. In this case, the equivalent resistance to use in FIG. 1 is given by Equation 2:

$$R_{spd} = R_{sq} \qquad \text{Equation 2:}$$

Where $R_{sq}$ is the resistance per square of the conducting layers 10 and typically ranges from 200 to 500 ohms.

Figure 4:
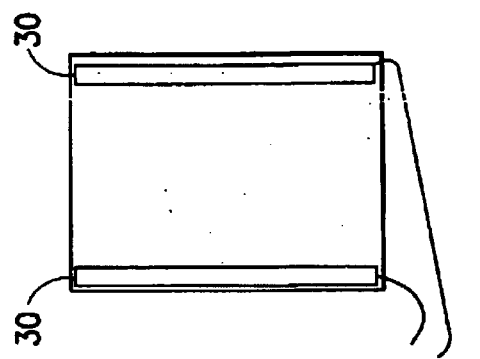
FIG. 4 is an example of a rectangular piece of SPD film.

When the SPD load is rectangular, the conducting busses 30 may run along either the longer or the shorter sides of the SPD load. FIG. 4 illustrates an SPD load in which the busses 30 run along the longer sides, which is the preferred location of the busses if the main consideration in bus placement is to minimize power losses. However, as will be discussed in further detail below, manufacturing costs and aesthetic considerations may also be considered in bus attachment, location, and size. For long busses 30, the resistance in the equivalent circuit of FIG. 2 is illustrated in Equation 3:

$$R_{spd} = R_{sq} \frac{L_{short}}{L_{long}} \qquad \text{Equation 3}$$

Running the conducting busses 30 along the longer sides of the SPD load has been preferred in the past because it results in a more energy-efficient window since the SPD resistance in the charging path of each active cell is decreased. That is, the path between the respective busses 30 to the opposite edge of the SPD load is minimized. Since the charging current for the SPD windows must pass through this resistance, placement of the conducting busses 30 along the longer side of a rectangular SPD load results in smaller $I^2R$ power losses.

Figure 5:
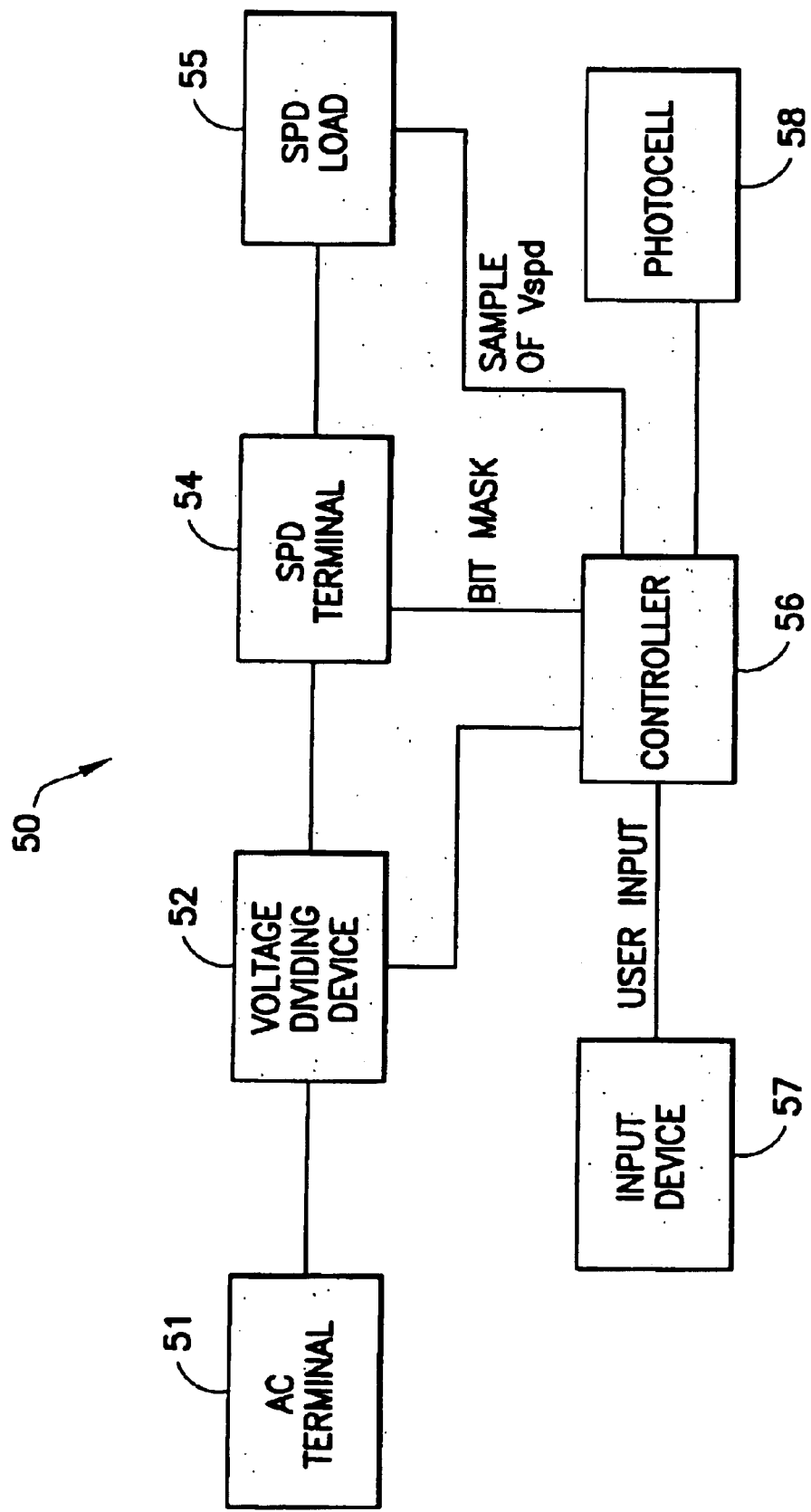
FIG. 5 is a block diagram of a voltage controlling device according to an embodiment of the present application.

FIG. 5 is a block diagram of a voltage controlling device 50 according to an embodiment of the present application.

The voltage controlling device 50 of FIG. 5 is more specifically a block diagram of a local controller for use preferably with a single window (SPD load), or at most for use with a few SPD loads.

The voltage controlling device 50 includes an AC terminal 51 adapted to receive an AC voltage signal, a voltage dividing device 52 that divides the AC voltage signal into a plurality of distinct voltage levels within a predetermined range. Controller 56 controls the voltage dividing device 52 to provide a selected distinct voltage level to the SPD terminal 54 based on voltage level information. The SPD terminal 54 provides the selected distinct voltage level to the SPD load 55. An input device 57 may be provided to allow a user to input the voltage level information. A photocell 58 may be provided to monitor a light level at the SPD load 55 and the light level may be used as the voltage level information.

The AC terminal 51 provides an AC voltage signal to the voltage controlling device 50. In a simple case, AC voltage is supplied by the AC line voltage, 120 V/60 Hz in the United States and 240 V/50 Hz in other parts of the world. However, any AC power source may be utilized, such as a dc-to-ac converter, commonly referred to as an inverter, a transformer working off the mains, a capacitive-voltage divider working off the mains, or any circuit or device capable of delivering sufficient AC voltage of any frequency to satisfy the SPD load requirements. In certain situations it may be preferable to provide a separate AC power supply which will be discussed in further detail below.

The voltage dividing device 52 may contain any electrical device that produces a voltage drop when AC current flows through it. Preferably, the voltage dividing device 52 divides the AC voltage signal into a plurality of distinct voltage levels in a predetermined range. Preferably, the voltage dividing device divides the AC voltage into a plurality of non-continuous distinct voltage levels in a predetermined range. In a preferred embodiment of the present application, the voltage dividing device 52 includes a capacitor array 60 and a switch array 62 (see FIG. 6). The capacitor array 60 preferably includes n capacitors which will provide $2^n$ voltage levels to the SPD load. It is preferable to provide an array of capacitors capable of providing a large range of distinct voltages. For instance, a large capacitors array 60 of 8 capacitors can be properly switched via the switch array 62 to produce 256 distinct voltage levels. A large array such as described above, referred to as a "byte array", would be desirable in a universal controller, that is, a controller that is capable of controlling an SPD load of any size. For instance, if a structure has many windows of different sizes between 1 and 32 square feet, a byte array is preferable in that it has enough range to provide a range of voltages which would be applicable to all SPD loads in the structure regardless of the size of any specific SPD load. In other words, a voltage controlling device 50 like this can be used as a local controller for any SPD windows without regard to the area of the window and thus is referred to as a universal controller. In fact, a byte array has enough inherent range that it can simultaneously control a bank of SPD windows whose aggregate area may be hundreds of square feet.

Figure 6:
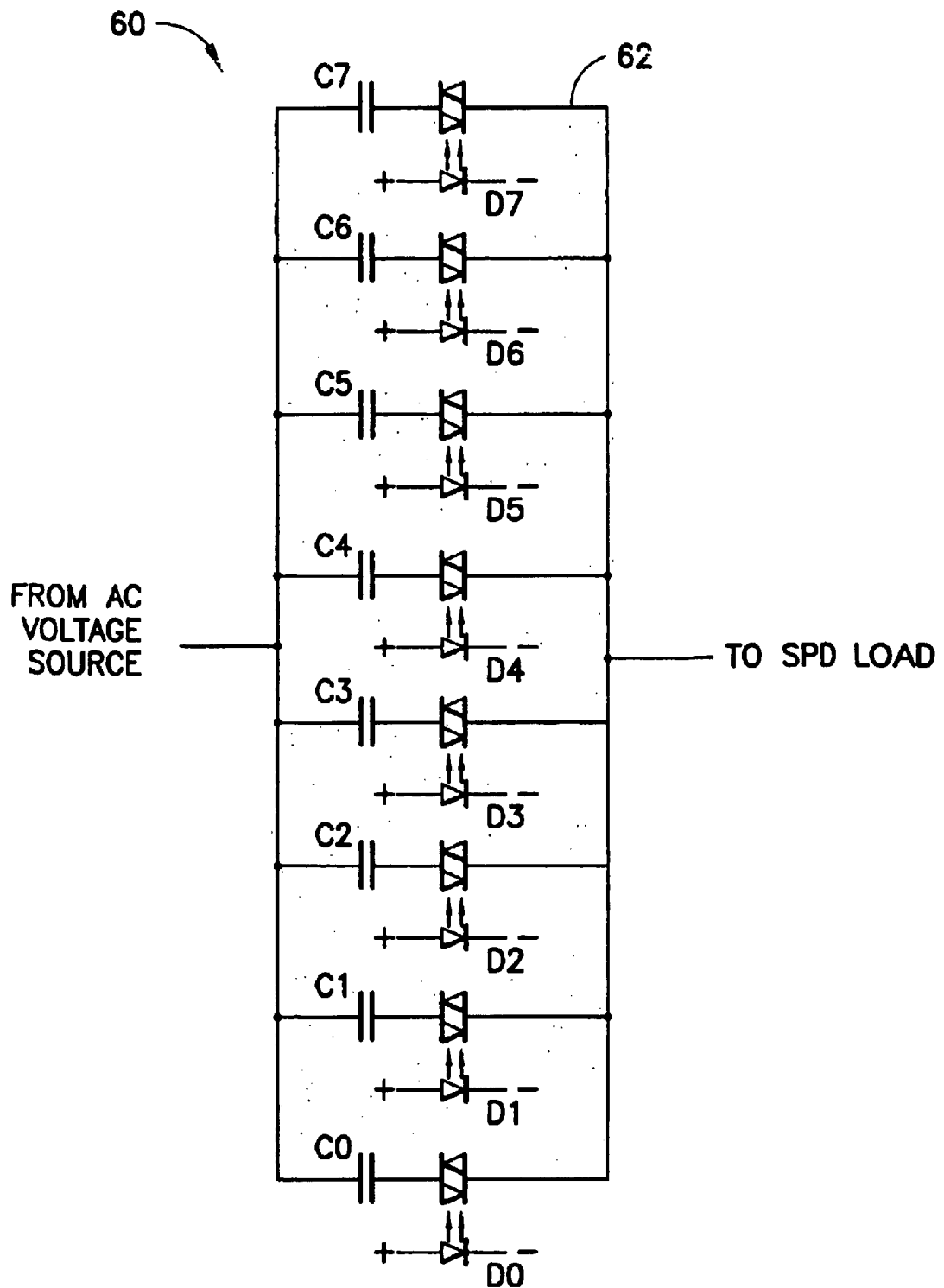
FIG. 6 is a circuit diagram of a voltage dividing device according to an embodiment of the present application.

The switch array 62 preferably includes n switches. Each capacitor ($C_0$ to $C_7$) of the capacitor array 60 is connected to one of the switches of the switch array 62. If one switch is activated, the corresponding capacitor is connected to the SPD load 55, preferably via the SPD terminal 54. If two switches are activated, two capacitors in parallel are connected to the SPD load and will drive the SPD load. In general, if n switches are activated, there are n parallel capacitors driving the SPD load. In the byte-array embodiment of this invention, the voltage dividing device 52 includes 8 capacitor-switch combinations as shown in FIG. 6. In this example, optocoupled triacs are used as bilateral switches, however, solid-state relays, mechanical relays, and other types of electronic or even ordinary switches may also be used for the bilateral switches.

In a voltage dividing device 52 of the present invention, using the capacitor array 60 and the switch array 62 allows the voltage controlling device 50 to provide a wide range of distinct voltage levels to the SPD load. In addition, since the voltage is divided using a primarily capacitive device, the voltage controlling device 50 of the present invention minimizes losses which are common in traditional voltage controlling devices since capacitive devices are largely lossless when used in AC circuits. As noted above, a continuous range of voltage levels is unnecessary for most SPD loads, thus, the capacitor array 60 which provides an excellent means for dividing the AC voltage into a plurality of distinct voltage levels is preferable to the continuous range commonly provided by potentiometers of conventional voltage controlling devices. The byte array embodiment discussed above, provides an additional advantage in that the range of distinct voltage levels available is large enough to be used by an SPD load of almost any practical size.

A smaller capacitor array, however, may be preferable for other applications. For example, a capacitor array 60 of 4 capacitors can produce 16 distinct voltage levels. Such a small capacitor array, referred to as a "nibble array", would be suitable for an SPD window of a specific size. For instance, if every window in a building is exactly 16 square feet in size, then a voltage controlling device 50 utilizing a small 4-capacitor array designed for 16 square-foot windows would be preferable. It is important to note that the reduced number of capacitors in the nibble array does not in any way limit the advantages in efficiency provided by use of a capacitor array in general discussed above. In general, byte arrays are used in SPD applications in which SPD load size varies widely and nibble arrays are used for SPD applications involving the SPD windows of the same size. Although the discussion emphasizes byte and nibble arrays, it is understood that the voltage controlling device and methods of the present invention can be implemented with fewer than four bits, more than eight bits, or any number of bits in between.

The SPD terminal 54 connects the SPD load 55 to the voltage dividing device 52. In a simple embodiment, the SPD terminal may simply include the wires and connecting busses 30 which connect the voltage dividing device 52 to the SPD load. More simply, the SPD terminal may simply be embodied by the connecting busses 30 discussed above.

The controller 56 controls the voltage dividing device 52 such that a plurality of distinct voltage levels with a predetermined range are provided to the SPD load 55 based on the voltage level information. More specifically, in a preferred embodiment of the present invention, outputs of the controller 56 control the on-off action of diodes $D_0$ to $D_7$ of the bilateral switch array 62. When activated, these diodes close the bilateral switches and create a parallel connection of the activated capacitors. By combining the effects of different capacitors ($C_0$ to $C_7$) a wide range of voltages are provided to the SPD load 55 such that any desired light transmission level can be produced in an SPD load of any size.

Generally, the controller 56 determines which bilateral switches of the bilateral switch array 62 are active. When 8 capacitors and 8 bilateral switches are used in the voltage dividing device 52, the total parallel capacitance of the capacitor array 60 is given by Equation 4:

$$C_T = C_7 * Bit\ 7 + C_6 * Bit\ 6 + C_5 * Bit\ 5$$
$$+ C_4 * Bit\ 4 + C_3 * Bit\ 3 + C_2 * Bit\ 2$$
$$+ C_1 * Bit\ 1 + C_0 * Bit\ 0 \qquad \text{Equation 4}$$

where bit 7 through bit 0 represent the outputs of controller 56. These bits may be either high or low, resulting in a minimum nonzero capacitance of:

$$C_{T(min)} = C_0$$

When all bits are high, the maximum capacitance is $$C_{T(max)} = C_7 + C_6 + C_5 + C_4 + C_3 + C_2 + C_1 + C_0$$

The controller 56 controls the capacitor array 60 and the switch array 62 to produce a wide and comprehensive range of capacitance values with only a small number of capacitors and bilateral switches. This wide array of capacitance values can thus be placed in series with the SPD load to provide a wide array of AC voltage levels to the SPD load. Note that 255 distinct non-zero values of total capacitance can be created by an array of 8 switched capacitors.

For example, the largest and most comprehensive range of capacitance of the capacitor array 60 is obtained by using the capacitors with the following capacitances:

$$C_7 = 128 C_0$$
$$C_6 = 64 C_0$$
$$C_5 = 32 C_0$$
$$C_4 = 16 C_0$$
$$C_3 = 8 C_0$$
$$C_2 = 4 C_0$$
$$C_1 = 2 C_0$$

Since all capacitance values depend on the value of $C_0$, that value must be selected so as to create a total possible capacitance that increases the AC voltage to the maximum desired value ($V_{max}$) and yet small enough to decrease the light transmission of the SPD to near zero, when the smallest SPD load is encountered. In practice, the ideal capacitance values can be achieved by capacitor selection, by custom-made capacitors, or by a connection of several capacitors to produce each ideal value. However, using ideal values is not necessary. Standard commercially available capacitors that approximate the ideal values result in voltage controlling devices that are acceptable in most SPD applications.

As an example of how the capacitor array 60 and the bilateral switch array 62 can produce a comprehensive sequence of capacitance within a desired range, if one assumes that the SPD film, that is the SPD load in the present case, has a capacitance of 90 nF per square foot, the best value to select for $C_0$ is 10 nF. Then, $C_1$=20 nF, $C_2$=40 nF, $C_3$=80 nF, $C_4$=160 nF, $C_5$=320 nF, $C_6$=640 nF, and $C_7$=1280 nF. Thus, the sequence of capacitances provided by the capacitor array 60 and bilateral switch array 62 is:
10 nF, 20 nF, 30 nF, 40 nF, 50 nF, 60 nF, 70 nF, 80 nF, ..., 160 nF, 170 nF, 180 nF, ..., 320 nF, 330 nF, ..., 640 nF, 650 nF, ..., 1280 nF, 1290 nF, 1300 nF, ..., 2530 nF, 2540 nF, and 2550 nF.

It is noted that with 8 capacitors and 8 bilateral switches, a total of 256 digitally selectable capacitance values covering the range of 10 nF to 2550 nF in 10-nF increments are provided. These capacitance values correspond to a total of 256 selective voltage levels that can be applied to the SPD load. In fact, since the present example utilizes the byte array embodiment, the wide variation of AC voltages is capable of controlling any SPD load of any size as noted above.

As noted above, however, the voltage controlling device and methods of the present application are not limited to a voltage controlling device utilizing a voltage dividing device utilizing 8 capacitors and 8 bilateral switches. A simpler embodiment of the invention can be used when a plurality of windows having the same given size will be used. For instance, if five windows of 16 square feet each are to be individually controlled, the invention could be embodied with nibble arrays rather than byte arrays. With SPD film that has a capacitance of 40 nF per square foot, the required array capacitors are:

$$C_3 = 470\ nF$$
$$C_2 = 220\ nF$$
$$C_1 = 100\ nF$$
$$C_0 = 47\ nF$$

This nibble array can produce capacitances from 47 nF to 837 nF, i.e., more than enough to control the light transmission of an SPD load with an area of 16 square feet.

Figure 7:
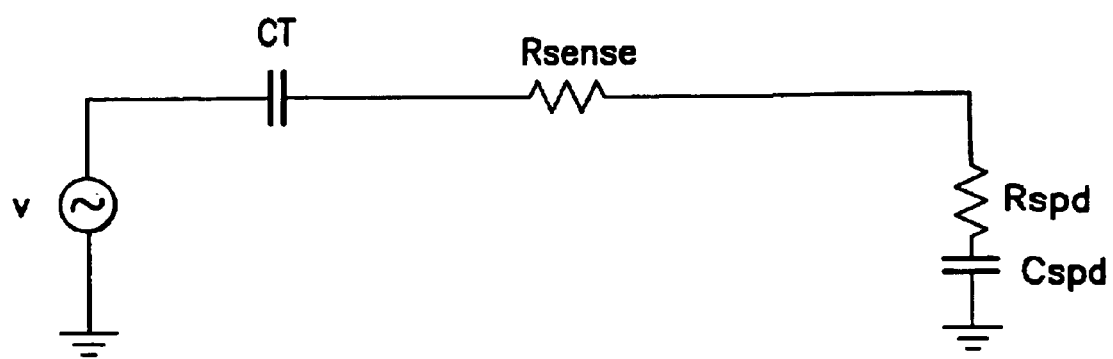
FIG. 7 is a simplified AC equivalent circuit of the total capacitance of the circuit of FIG. 6.

To better understand the overall concept of the invention, it is useful to examine the mathematics behind the invention. After the controller 56 has ported the bit mask to the bilateral switches of the switch array 62, a total capacitance of $C_T$ is placed in series with the SPD load 55 as shown in FIG. 7. The capacitive reactances of the total capacitance and the SPD film capacitance are given by Equation 6 and Equation 7:

$$X_T = \frac{1}{2\pi f C_T} \qquad \text{Equation 6 and Equation 7}$$

and $$X_{spd} = \frac{1}{2\pi f C_{spd}}$$

The AC current in this circuit is given by Equation 8:

$$I = \frac{V}{\sqrt{R_{spd}^2 + (X_T + X_{spd})^2}} \qquad \text{Equation 8}$$

and the AC voltage across the SPD load is given by Equation 9:

$$V_{spd} = I \sqrt{R_{spd}^2 + X_{spd}^2} \qquad \text{Equation 9}$$

or Equation 10:

$$V_{spd} = \frac{\sqrt{R_{spd}^2 + X_{spd}^2}}{\sqrt{R_{spd}^2 + (X_T + X_{spd})^2}} V \qquad \text{Equation 10}$$

The nonlinear Equation 10 shows how the voltage dividing device 52 creates any desired SPD load voltage. With this equation, a suitable value of $C_0$ can be selected, which then can be used to define all capacitor values ($C_1$ to $C_7$) in the capacitor array 60. Because of the nonlinear relation between $V_{SPD}$ and the AC source voltage V, a computer solution is the most convenient way to do a complete analysis for all SPD loads.

Since the AC equivalent circuit of an SPD load is a series RC circuit, one can use the figure of merit for a capacitor defined by Equation 11:

$$Q = \frac{X_{spd}}{R_{spd}} \quad \text{Equation 11}$$

With smaller SPD loads, the Q is considered high (greater than 10) and the SPD load is primarily capacitive. As the surface area of the SPD film increases, the capacitive reactance decreases while the resistance remains unchanged, given a square window. In this case, the Q decreases. As one approaches larger surface areas, i.e., greater than 16 square feet, the Q at 60 Hz decreases to less than 10. For this reason, power losses increase nonlinearly for larger windows.

It can be shown that the power losses increase in proportion to the square of the surface area. For instance, a 16 square-foot window has 256 times as much power loss as a 1 square-foot window. For the high-Q case, the equation for current in FIG. 7 may be approximated by Equation 12:

$$I \cong \frac{V}{X_T + X_{spd}} \quad \text{Equation 12}$$

Since this current flows through the SPD load, the approximate voltage across the SPD load in the high-Q case is given by Equation 13:

$$V_{spd} \cong \frac{X_{spd}}{X_T + X_{spd}} V \quad \text{Equation 13}$$

The surface area of currently available window sizes typically varies from 1 square foot to 32 square feet. This implies that $X_{spd}$ varies over a 32-to-1 range. The capacitance per square foot depends on the thickness of the dielectric layer between the conducting layers and also on the dielectric constant. As a guideline for this discussion, the capacitance is approximately 40 nF per square foot. Therefore, the approximate capacitance range of SPD loads will be from 40 nF to 1.28 microfarads. This 32-to-1 range establishes the first preferred parameter for a universal controller if one is desired. As mentioned earlier, the present invention can be embodied as a local voltage controlling device with a large capacitor array of 8 bits or more with a view toward producing a universal controller, a device that can produce the required voltage and current for any SPD window between 1 and 32 square feet. On the other hand, if the window sizes in a given application are all more or less of the same surface area, the invention can be implemented with a smaller capacitor array. A 4-bit array, for example, can be optimized for use with a given window size because a 4-bit array can produce 16 distinct voltage levels, more than enough to control light transmission of a specific window size.

Figure 8:
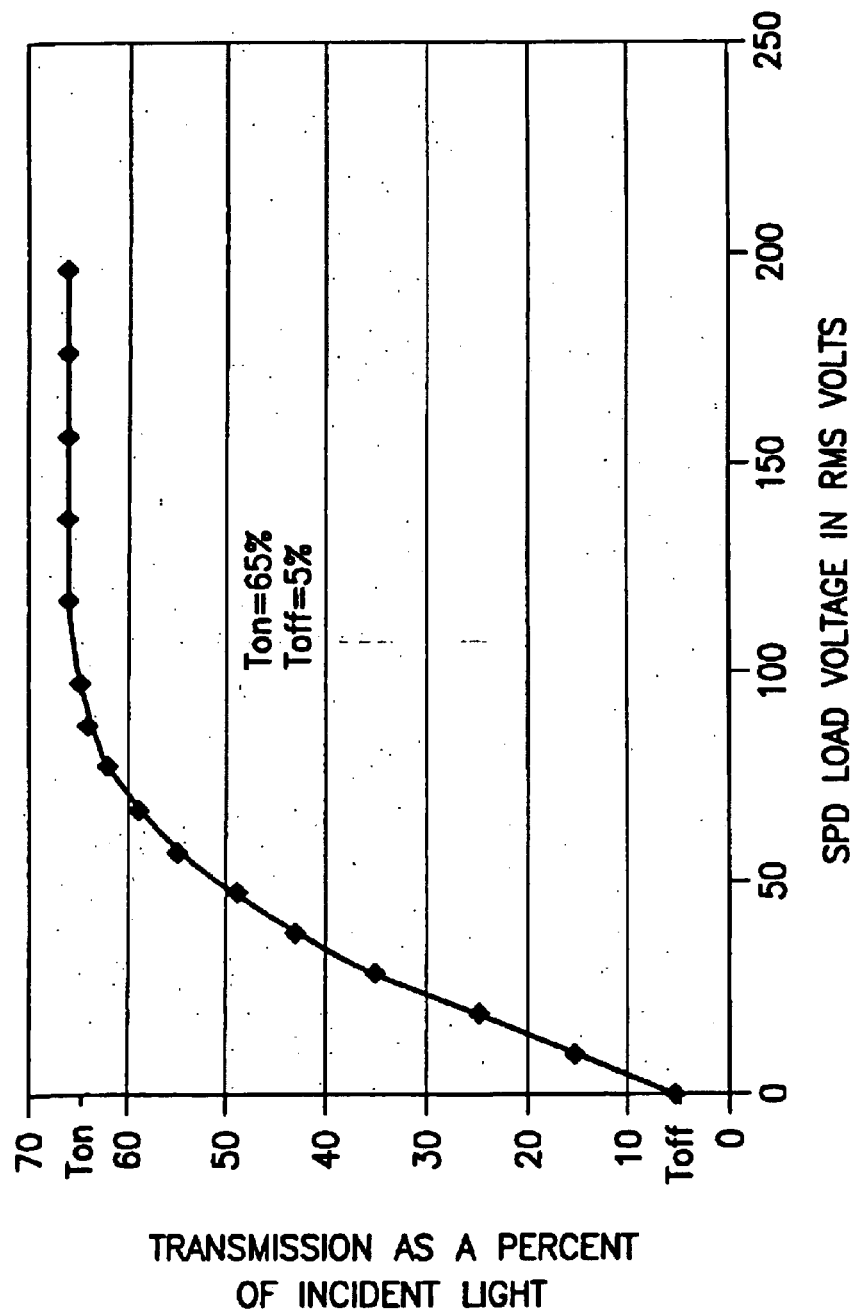
FIG. 8 is a graph of the light transmission through an SPD load versus the AC voltage across the SPD load.

In addition to providing a 32-to-1 range of total capacitance to accommodate all SPD loads in a universal controller, there is the issue of the voltage variation required for any given SPD load, that is, a specific SPD window size. FIG. 8 shows a graph of light transmission versus SPD voltage for an SPD film with a light transmission that varies between 5 percent and 65 percent. The values in this range are illustrative but not be construed as defining all possible values for SPD film. Many different ranges of light transmission are possible by varying the thickness of the SPD film, the SPD particles, and other factors. However, the graph illustrates these points:

At zero voltage, a minimum light transmission exists. This is symbolized as $T_{off}$.

At maximum voltage, a maximum light transmission occurs. This is symbolized as $T_{on}$.

Beyond approximately 60 V a minimal increase occurs in light transmission.

Because of the above-described relationships, a compromise is possible between acceptable light transmission and the voltage required to produce such transmission. To assist in understanding the invention, it should be understood that a universal local controller that is capable of varying the AC voltage from 0 to approximately 60 V rms will capture most of the useful range of light control. Naturally, this approximate range was considered when selecting 60 V rms as the maximum voltage provided by the voltage controlling device because where the SPD load voltage is increased above the 60 V rms level, there is a minimum increase in the clarity of the SPD load. In some applications, slightly more or slightly less voltage might be desired or acceptable.

As noted previously, the human eye is unable to detect small changes of light transmission. For instance, the eye cannot discern a change of 1 percent in light transmission. Rather, it takes changes of approximately 10 to 20 percent before the eye can detect changes in light level. Therefore, a controller that can produce 8 distinct voltage levels between 0 and 60 V provides a satisfactory range of adjustment. Specifically, a voltage controlling device that can produce the following voltages is satisfactory as a universal controller:

0, 7.5, 15, 22.5, 30, 37.5, 45, 52.5, 60 V

These being the case, one can now see why an 8 capacitor-switch combination is a satisfactory solution for a universal local controller. To begin with, there is the preferred parameter of a 32-to-1 range to accommodate any SPD load size. Then, as noted above, a specific SPD load is satisfactorily activated when 8 distinct voltage levels are used. The product of these preferred parameters is 8 times 32, or 256, which is the total number of distinct states that a voltage dividing device with an 8 capacitor array and 8 switch array has.

As mentioned earlier, the foregoing discussion should not be construed as limiting the voltage controlling device of the present invention to a controller realized in 8-bit arrays. Depending on the application and user acceptance, smaller arrays with larger increments between total capacitance values may be acceptable. Likewise, there might arise a situation where a 10-bit array might be desired for larger SPD loads. At the other extreme is the 4-bit array with its 16 distinct states, which is more than enough range to allow a design for a specific window size.

The voltage controlling device 50 of the present invention is useful in preventing the user from being shocked. Although SPD windows use low current and should not pose any serious shock risk, it is still important to use properly designed electronics to control these SPD windows. As discussed earlier, currently available SPD film requires only 1 mA per square foot to provide a clear state. With this mind, let us now consider the issues surrounding the potential for electrical shock.

FIG. 9 is a table of Shock Physiological Effects. Notice that currents up to 8 mA are considered safe because a person can let go at will since muscular control is not lost.

Dry skin has a resistance in the hundreds of kilohms, whereas wet skin may have a resistance as low as 1000 ohms. Because the SPD load voltage is relatively low, the danger of electrical shock exists only when wet skin makes contact with exposed busses 30 or the conducting layers 10. Although the busses 30 and conducting layers 10 are insulated, there is a need for some form of shock protection in some applications where window breakage occurs. Even in this situation, the insulation on the busses 30 and conducting layers 10 should remain intact to prevent shock. Nevertheless, notwithstanding the above, various forms of shock protection are included in the voltage controlling device of the current invention.

FIG. 10 shows an AC equivalent circuit of one embodiment of the voltage controlling device 50 of the present invention driving an SPD load, which is some distance away. If the SPD film is damaged by glass breakage or by piercing or cutting of any kind, a potential may exist for an electrical shock. $R_{SHOCK}$ represents the skin resistance of a person. The ground return on $R_{SHOCK}$ may be either through a ground fault or through a direct return on the neutral side of the line. At this point in the discussion, a voltage $V_{WS}$, the SPD load voltage with shock when the shock current is 5 mA or more should be determined. To this end, one begins by using a transformation of the SPD series equivalent circuit into its parallel equivalent circuit using Equations 13–15:

$$Q = \frac{X_{spd}}{R_{spd}}$$ Equation 13-15

$$R_P = R_{spd}(1 + Q^2)$$

$$X_P = X_{spd}(1 + \frac{1}{Q^2})$$

Figure 12:
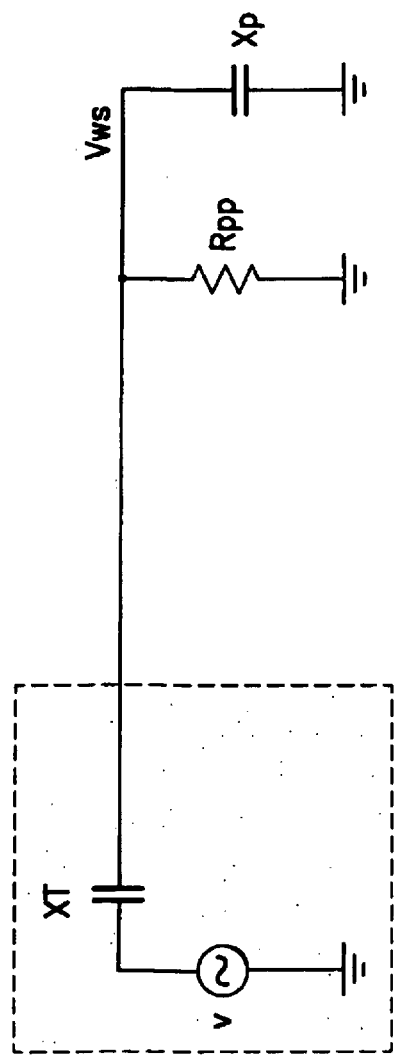
FIG. 12 is a simplified equivalent circuit of FIG. 11 where the shock resistance has been combined with the equivalent parallel resistance of the SPD load.

The first equation determines the figure of merit Q of the SPD load 55. The second equation determines the parallel equivalent effect of the series equivalent resistance. The third equation determines the parallel equivalent reactance of the series equivalent reactance. These transformations imply the modified equivalent circuit of FIG. 11. In this figure, the two resistances are in parallel and may be reduced to a single resistance $R_{PP}$ shown in FIG. 12. In a final transformation, the parallel branches of $R_{PP}$ and $X_P$ are transformed into a series equivalent circuit using Equations 16–18:

$$Q_{PP} = \frac{R_{PP}}{X_P}$$ Equation 16-18

$$R_S = \frac{R_{PP}}{1 + Q_{PP}^2}$$

$$X_S = \frac{X_P}{1 + 1/Q_{PP}^2}$$

Figure 13:
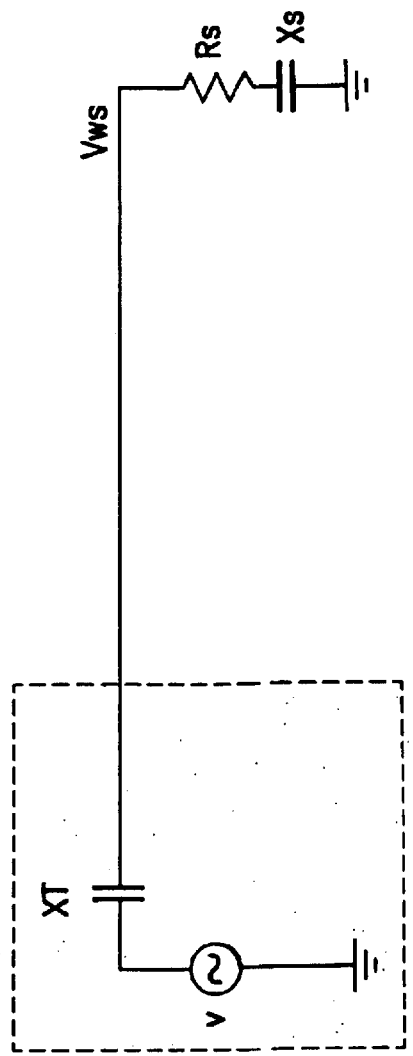
FIG. 13 is a final series equivalent circuit of FIG. 12 providing for a comparison of SPD load voltage with shock to normal SPD load voltage.

These final transformations imply the equivalent circuit of FIG. 13. In this highly simplified form, it is relatively easy to calculate the effect of the shock resistance. The result is a series RC circuit current with shock current $I_{WS}$ given by Equation 19:

$$I_{WS} = \frac{V}{\sqrt{R_S^2 + (X_T + X_S)^2}}$$ Equation 19

Referring to FIG. 7, one can see that the normal value of current is given by Equation 20:

$$I_N = \frac{V}{\sqrt{R_{spd}^2 + (X_T + X_{spd})^2}}$$ Equation 20

The most convenient way to compare the SPD load current with shock to the normal current is with a computer simulation that includes a shock resistance that varies from 1000 ohms to 12,000 ohms for any SPD load. The reason for 12,000 ohms being chosen as the upper limit is because the preferred embodiment of the invention limits the maximum voltage to 60 V rms, which implies a maximum possible shock current of 5 mA when the shock resistance is 12,000 ohms.

It is to be understood that the capacitor array 60 reduces the input voltage from the AC terminal 51 to vary the SPD load voltage because its impedance is in series with the SPD load. In other words, the AC current flows through this impedance, resulting in a reduced SPD load voltage. Since the controller 56 determines the value of this impedance, it effectively determines the SPD load voltage. In a preferred embodiment of the present application, an SPD load voltage is monitored by the controller 56. A normal value of SPD load voltage provided by the voltage controlling device is sampled and stored in a memory (not shown) of the controller 56 in a manner well understood by one of ordinary skill in the art. This normal value is used as a benchmark for determining the presence of any shock current. Alternatively, normal SPD load voltage levels may be preloaded into the memory to establish the benchmark. The appearance of either ground fault or direct-contact fault reduces the value of SPD load voltage to a level that is noticeably less than the normal SPD voltage. The controller 56 continuously monitors the SPD load voltage and compares it to the normal value. The controller 56 can quickly determine when the SPD load voltage differs significantly from its normal value and can take appropriate action to shut down the power, that is to reduce the SPD load voltage to 0, in the case of a large drop in SPD voltage.

Turning now to a discussion of how the current invention will shut off the power when a shock current equal to or greater than 5 mA appears, as noted previously, the SPD load voltage is continuously sampled by the controller 56. More specifically, the controller samples the SPD load voltage via an analog-to-digital converter that can be included in the controller which transforms the AC SPD load voltage signal into an 8 bit digital signal that can be used by the controller 56. In a typical embodiment of the invention, the maximum voltage applied to any SPD load of any size is limited to approximately 60 V rms to minimize energy losses in the resistance of the conducting layers 10 as well as any resistance in the voltage controlling device 50 itself. To detect the SPD load voltage, one can use its average value, rms value, or peak value. Because the peak value is well defined and easy to measure, the preferred embodiment of the voltage controlling device of the present invention will use the peak value, with the understanding that any characteristic of the SPD load that is related in a one-to-one correspondence to the rms value may be used. The peak voltage corresponding to 60 V rms is given by Equation 21:

$$V_P = \sqrt{2}(60\ V) = 85\ V$$ Equation 21

The digital output of an AD converter typically has at least 8 bits. If one uses an AD converter with an 8-bit output, the least significant bit (LSB) at the SPD-load sample point is given by Equation 22:

$$LSB = \frac{85 \text{ V}}{255} = 0.333 \text{ V} \qquad \text{Equation 22}$$

This represents the minimum detectable change in SPD load voltage.

Returning to FIG. 10, note the following. Under normal conditions, $R_{SHOCK}$ is infinite, that is, there is no shock condition. After the user makes an adjustment via the input device 57, for example, to alter the clarity of the SPD load, the SPD voltage is relatively stable. The SPD load voltage after stabilization is the normal SPD load voltage, symbolized by $V_N$, which the controller 56 stores in its memory. If any situation should arise where $R_{SHOCK}$ decreases because the SPD film has been pierced or cut, then the SPD load voltage with shock, symbolized by $V_{WS}$, will decrease because of the loading effect that occurs when additional current flows through the voltage dividing device 52. With proper design, the decrease in SPD load voltage is large enough with 5 mA of shock current to be detectable by the controller 56. The controller 56 is continuously monitoring the SPD load voltage, however, and comparing it to the normal SPD voltage stored in its memory. If a shock current equal to or greater than 5 mA should occur, the controller 56 will detect this condition and immediately shut off the power to the SPD load.

As noted previously, the resistance of dry skin is typically several hundred thousand ohms, which means very low shock currents exist with dry skin. However, when the skin is perspiring or wet, skin resistance may drop to as low as 1 kilohm. In a preferred embodiment of the current invention, the maximum SPD load voltage is limited to 60 V. Therefore, the critical or highest skin resistance that can produce a shock current of 5 mA is given by Equation 23:

$$R_{critical} = \frac{60 \text{ V}}{5 \text{ mA}} = 12 \text{ kilohms} \qquad \text{Equation 23}$$

Any resistance less than 12 kilohms may be dangerous because it can produce a shock current in excess of 5 mA. For instance, a skin resistance of 2 kilohms produces a shock current of 5 mA with an SPD load voltage of only 10 V rms. Therefore, it is necessary to determine the values of $V_N$ and $V_{WS}$, and then calculate the difference between them, which is symbolized as DIFF. The value of DIFF in LSB (least significant bit of the AD converter) must be large enough to ensure reliable detection of a 5-mA shock under all operating conditions. For instance, with the equations discussed earlier, the following are the results for a 16 square-foot window, a skin resistance of 5 kilohms, and a shock current of 5 mA:

$V_N$=30.8 V rms=43.5 Vpeak $V_{WS}$=25.7 V rms=36.3 Vpeak

DIFF=7.2 V=21.6 LSB

AD converters typically are accurate and reliable to within 0.5 LSB, so the foregoing difference of 21.6 LSB is easily detectable by the controller. Additional calculations show that largest deviations from normal SPD voltage with a shock current of 5 mA occur for smaller window sizes and lower skin resistances. With larger window sizes like 32 square feet, DIFF becomes smaller but is still detectable because it is more than 2 LSB under any operating condition where the shock current is 5 mA. The conclusion is that the local controller can detect any shock current equal to or greater than 5 mA, no matter what the window size or skin resistance.

The current invention has an additional benefit in the area of security. If a burglar or other intruder breaks an SPD window to enter a home, office, vehicle, or other area, the capacitance of the SPD load changes and causes the window current to change. This change in window current is detectable based on the change in SPD load voltage using the same mechanism as that used to detect the presence of a shock current described above. The difference is that instead of looking for a drop in SPD load voltage, the controller 56 detects an unwanted increase in SPD load voltage. When a substantial increase in SPD load voltage above the baseline level discussed above is detected, the controller 56 can send a signal to a burglar-alarm (not shown) to warn of the intrusion.

The input device 57 is any kind of tunable resistance or other means of producing a DC voltage suitable for use input to an analog-to-digital converter, hereafter referred to as an AD converter (not shown). Examples of such a tunable resistance are potentiometers that are rotary, slide, thumbwheel, finger-pressure, etc. Either acting alone or as part of a voltage to the AD converter. In a typical embodiment of the invention, this voltage is +5 V, the same voltage used to power the controller 56.

The AD converter may be incorporated in the controller 56 as shown in FIG. 5, or the AD converter may be a stand-alone device that works with a controller 56 that does not have built-in AD converters. In either case, when an 8-bit controller is used to embody the invention, the AD converter will have a digital output, typically 8 bits when 8 capacitors and bilateral switches are used, but not necessarily restricted to 8 bits. For instance, some AD converters produce 10-bit outputs. To use such an AD converter with an 8-bit controller, the controller 56 can be programmed to divide the decimal equivalent of the 10-bit number range by 4 to get an 8-bit range. In a preferred embodiment of the voltage controlling device 50 according to the present invention, the input device 57 creates a one-to-one correspondence between user input and the total capacitance value of the voltage dividing device 52. In this way, the user is able to tune in whatever total capacitance produces the desired light transmission through the SPD load 55.

The controller 56 is typically any microcontroller that has an arithmetic-logic unit (ALU), read-only memory (ROM), random-access memory (RAM), and input/output (I/O) ports. In FIG. 5, AD converters are included in the controller 56, but in the present invention these may be stand-alone units working in conjunction with a controller.

The controller 56 of FIG. 5 is programmed to sample the voltage produced by the input device 57 and produce a digital equivalent. With an 8-bit AD output, this will be a number between 0 and 255, spaced in intervals of 1, that is, 0, 1, 2, 3, ..., 255. This user-selected number is then ported to the controller output where it activates the bilateral switches of the bilateral switch array 62, which in turn, determines the total capacitance value of the voltage dividing device 52. This capacitance will then interact with the specific SPD load and result in a final SPD load voltage being greater for smaller SPD loads, and smaller for larger SPD loads. In the current invention, the quantity $C_0$ can be selected to accommodate a very large range of SPD loads. In fact, there is theoretically no limitation on the range of SPD loads that can be controlled because one can increase the number of capacitors and bilateral switches to whatever number is needed to satisfy any conceivable range of SPD loads. For example, one can use an array of more than 8 capacitors and bilateral switches. If one uses 10 capacitors and bilateral switches, the total capacitance can vary from 0 to $1023C_0$, which is a huge range capable of application with any SPD load with a film surface area between 1 square inch and 100 square feet.

In another embodiment of the voltage controlling device of the present application a photocell 58 as illustrated in FIG. 5 may be added. The photocell 58 may be any kind of light-detecting device such as a photoresistor, photodiode, or other such device that can deliver a voltage between 0 and V+, defined as the maximum allowable voltage of an AD converter. The controller 56 can be programmed to automatically turn off the power to the SPD load when the incident light detected by the photocell 58 approaches zero. In other words, to conserve power the microcontroller can turn off the power at night and allow the windows to go into the dark mode. This saves energy.

The light response of the photocell 58 may be stored in the memory of the controller 56. The controller 56 can be programmed to respond to various light levels during the daytime. When more sunlight strikes the photocell 58, the controller 56 can alter the capacitor array 60 via the switch array 56 to darken the SPD windows. In this way, automatic control of the SPD windows can be achieved.

To this point, the present application has concentrated on a voltage controlling device utilized in controlling voltage provided to one, or a few SPD loads. In the simplest case, the AC voltage provided to the controller is provided from the main lines. However, as noted above, in certain applications, it may be advantageous to provide a separate AC power supply, or source, to the voltage controlling device of the present invention. For example, when attempting to control many SPD loads simultaneously from a single voltage controlling device, a so called master controller, a separate AC power source operating at a frequency lower than 60 Hz may be provided. Because an SPD load 55 acts like a parallel-plate capacitor, its capacitive reactance is inversely proportional to frequency. Therefore, the SPD window current is directly proportional to frequency. If the AC voltage signal provided to the voltage controlling device 50 of FIG. 5 has a frequency of 30 Hz instead of 60 Hz, the window current drops in half. It is possible to reduce the frequency even lower, provided the frequency remains high enough to avoid window blinking, which occurs at approximately 10 Hz. The idea of using a very low frequency such as 15 Hz has major implications for power efficiency, cost advantages, simplified controller design, and a number of other benefits.

The minimum frequency of 15 Hz is a somewhat unexpected result. It is well known that movies are filmed at 24 frames per second and that the use of two-blade shutters increases the effective flash rate of movies to 48 frames per second, which is considered the minimum acceptable flash rate to avoid flicker. SPD particles respond twice per cycle to the AC voltage: once during the voltage transition from positive to negative, and a second time during the transition from negative to positive. Since there are two voltage transitions per cycle, the effective flash rate for a 15 Hz drive is 30 flashes per second. While this is lower than the known minimum flash rate utilized in movies to prevent flicker, flicker does not occur in the SPD load. Movies go completely dark between flashes, however, the clarity of an SPD load does not decrease to 0 between the negative to positive and positive to negative transitions of the AC voltage. The orientation of an SPD particle decays slowly, rather than instantaneously, because of Brownian motion toward a random state. This randomizing decay has a long enough time constant such that the SPD film does not go dark during a voltage transition. Instead, the SPD particles have only a small amount of time to randomize or decay between voltage transitions. The net effect observed by experimentation is that flicker in the SPD load is noticeable only when the driving frequency is as low as 10 Hz. Therefore, 15 Hz is sufficiently above the flicker threshold to safely avoid any flicker with SPD loads. Naturally a slightly lower frequency may also be utilized, provided it does not drop below the flicker threshold.

Figure 14:
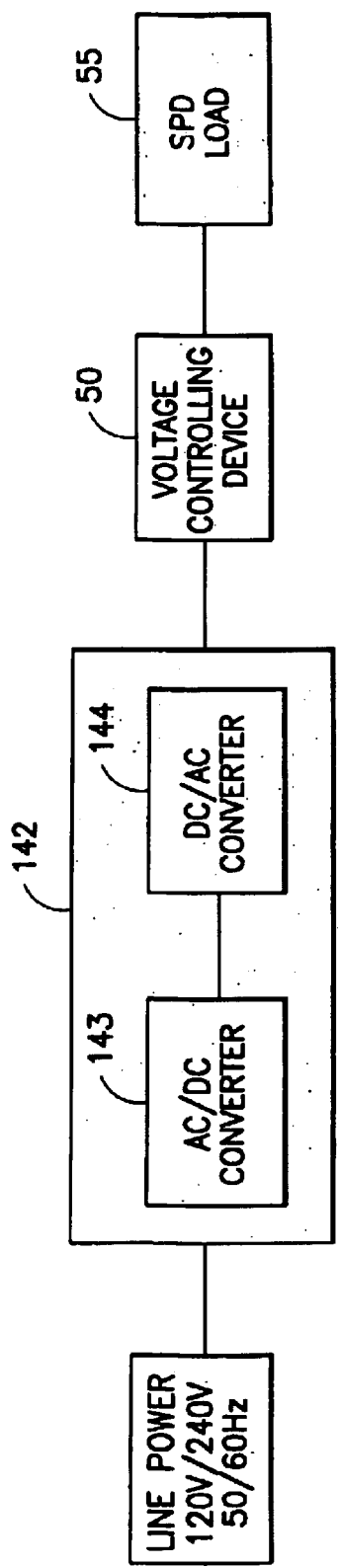
FIG. 14 is a block diagram of a voltage controlling device according to an embodiment of the present application.

FIG. 14 shows one embodiment of a voltage controlling device with its own AC power source 142 of 120 V and 15 Hz. For the sake of convenience, the same reference numbers will be used for elements of the voltage controlling device that correspond to the common elements of voltage controlling device 50 of FIG. 5. The conversion from 60 Hz to 15 Hz is accomplished in two stages. First, a first converter 143, i.e., an ac-to-dc converter, changes the input line voltage to a DC voltage. The DC output of the first converter 143 is used to drive a second converter 144, i.e., a dc-to-ac converter, that produces 120 V at the lower frequency of 15 Hz. This lower frequency voltage signal may then be supplied to the voltage controlling device 50 illustrated in FIG. 5 described above. In this embodiment, the SPD load 55 of FIG. 5 may be a plurality of SPD loads, such as several SPD windows, for example.

Figure 15:
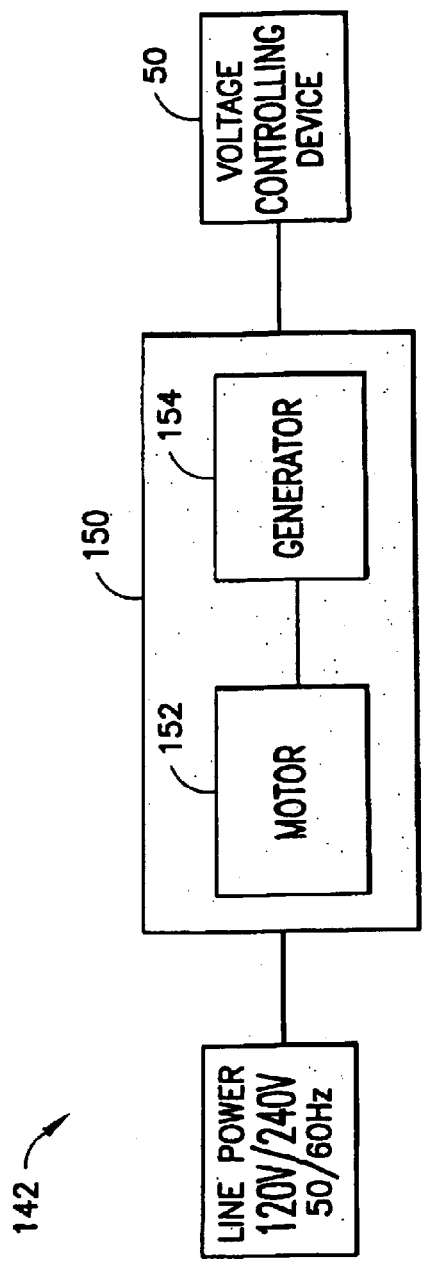
FIG. 15 is a block diagram of a voltage controlling device according to an embodiment of the present application.

Alternatively, in very large office buildings, for example, it might be cost effective to use a small motor-generator combination 150 as shown in FIG. 15 to produce the 120 VAC at a frequency of 15 Hz. In this embodiment, the AC power source 142 includes motor generator combination 150 which includes a motor 152 powered by the line voltage which in turn is used to power a generator 154 which produces the 120 V AC voltage at 15 Hz. This frequency is high enough to avoid window blinking and is low enough to reduce the maximum window current by a factor of four. The benefit of reducing window current by a factor of four is a reduction in the size of components and in the complexity of controller design. Stated another way, a given amount of window current can control four times as much window area when 15 Hz is used instead of 60 Hz. The low frequency AC voltage can then be supplied to the voltage controlling device 50 illustrated in FIG. 5 as the AC voltage signal.

Figure 16:
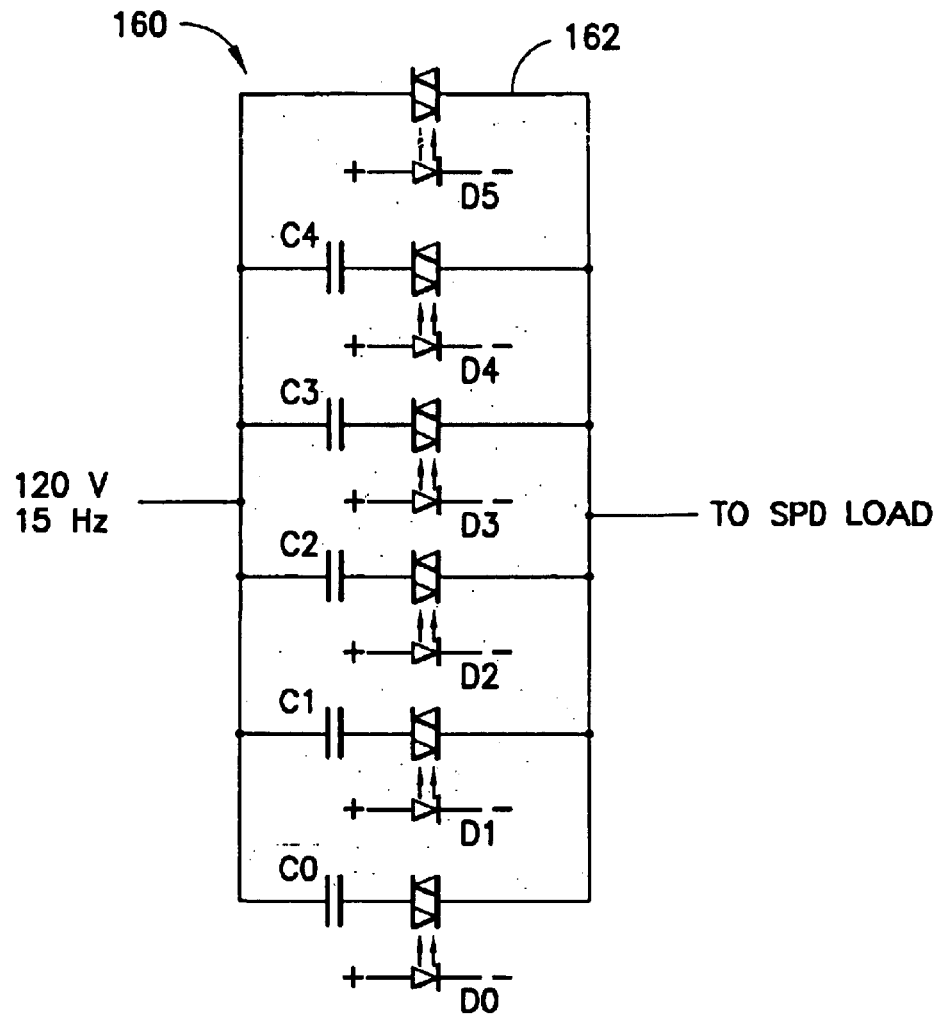
FIG. 16 is a circuit diagram of a voltage dividing device according to an embodiment of the present application.

With a low-frequency AC voltage source, a voltage controlling device can control a large number of office windows with high power efficiency. For instance, given a large office with 40 windows measuring 8 ft by 4 ft each, the total window area is 1280 square feet. A voltage controlling device for all of these windows could be implemented with a voltage dividing device 52 such as that included in the voltage dividing device 50 illustrated in FIG. 5 utilizing a 6-bit capacitor array 162 and switch array 164 shown in FIG. 16. The top bilateral switch of the bilateral switch array 162 connects the 120 V and 15 Hz and the remaining capacitors (4.7 nF, 10 nF, 22 nF, 47 nF, and 100 nF) to produce the different voltage levels. The capacitor array 162 and the switch array 164 will produce 64 distinct voltage levels ranging from 0 to 120 V. This would provide a satisfactory control of light transmission for 1280 square feet of SPD windows. Since capacitors produce the voltage levels, the invention has the benefit of eliminating the large variable transformers that conventional controllers use. Capacitors are more efficient than transformers since capacitors do not have the winding and core losses that transformers have.

Figure 17:
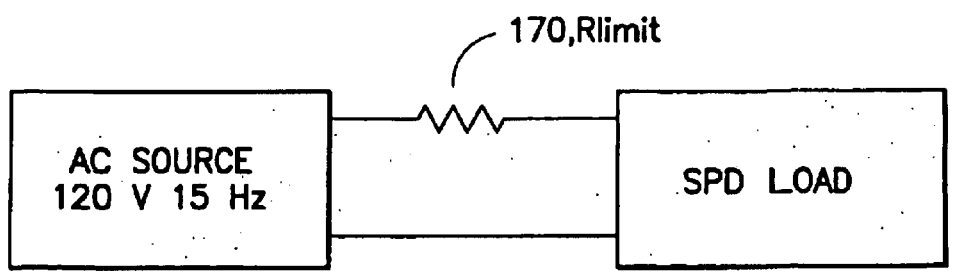
FIG. 17 is a circuit diagram of a voltage controlling device and an SPD load according to an embodiment of the present invention.

For shock protection on the individual windows receiving the 120 V at 15 Hz, one can use an alternative method of shock-protection. Because the required SPD load currents are four times smaller at 15 Hz than they are at 60 Hz, one can add a current-limiting resistor 170 in series with each individual window as shown in FIG. 17. For windows up to 16 square feet, $R_{limit}$ has a value of approximately 24 kilohms. With a 120 V source, the maximum current under short circuit conditions is 5 mA. Therefore, if the window is broken, the maximum possible shock current is 5 mA. Under normal operating conditions, the voltage available to the SPD window will be a minimum of 60 V. For larger windows up to 32 square feet, the limiting resistor can be reduced to 15 kilohms. This produces an operating voltage of at least 60 V while ensuring that the maximum shock current is less than 8 mA. This use of current-limiting resistors on large SPD windows up to 32 square feet is feasible only at lower frequencies such as 15 Hz because it is only at these lower frequencies that the SPD currents are small enough to allow the use of current-limiting resistors on larger windows.

As noted previously, the placement of the busses 30 on the SPD load may be reconsidered to take into account factors other than power efficiency. FIG. 1 shows a cross-sectional view of SPD film with the two conducting layers 10, hereafter referred to as the indium-tin-oxide (ITO) layers. These ITO layers may have a sheet resistance in the range of 50 to 500 ohms with thicknesses of 100 to 10 nm. Basically, they form the plates of a parallel-plate capacitor. Each minute SPD cell inside an SPD film acts like a differential capacitor. Since the sheet resistance measured in squares is in series with each of the differential capacitors, one can visualize the SPD film as a large number of extremely small series RC circuits. By integrating the effect of all these distributed series RC circuits, one can arrive at a single lumped constant RC circuit to represent the SPD film. With the values of R and C of this lumped-constant circuit in mind, one of ordinary skill in the art would be readily able to follow the teachings above and provide an AC generator and controller to drive SPD loads.

Figure 18:
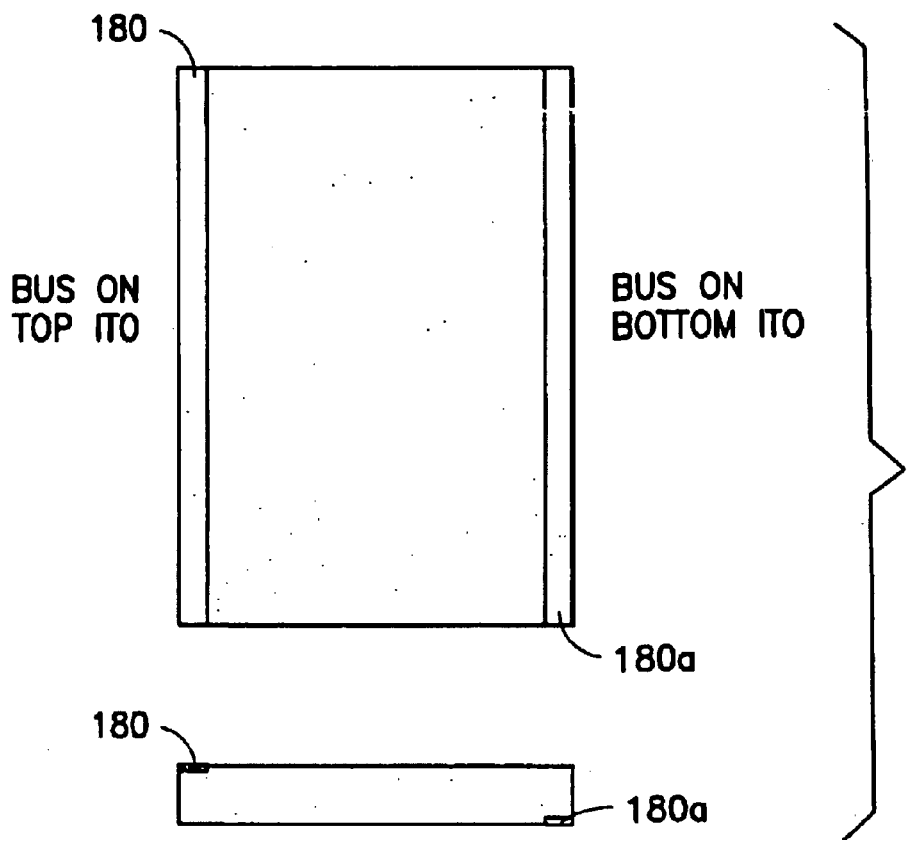
FIG. 18 is a diagram illustrating a conventional position of connecting busses in an SPD load.
Figure 19:
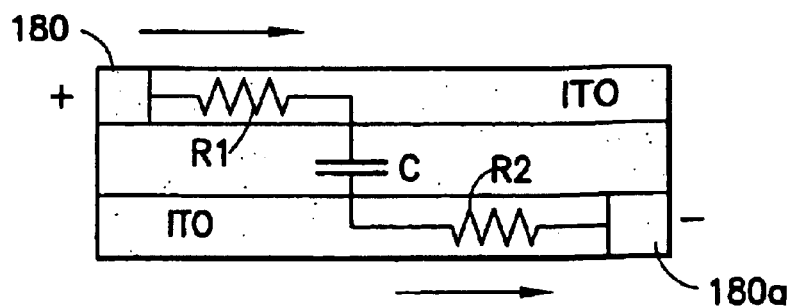
FIG. 19 is an RC equivalent circuit for the SPD of FIG. 18.

The state of art has been to rely on busses 30 that are on opposite sides of the SPD film as shown in FIG. 18. The bus 180 on the left is on the top ITO layer and the bus on the right 180a is on the bottom ITO layer. The reason for using this configuration is because the total charging resistance for any differential capacitor is a constant, no matter where the cell is located in the emulsion layer. FIG. 19 illustrates this point clearly. In other words, the total charging resistance for any cell is given by Equation 24:

$$R_{total}=R_1+R_2 \qquad \text{Equation 24}$$

For a given size window, $R_{total}$ has the same value for any cell because the same total number of squares of resistance are in the charging path. The advantage of the opposite-side busses 180, 180a is that a constant charging resistance for each cell implies a uniform response throughout the SPD film. The disadvantage is that the connecting wires to an SPD window may be as much as 4 ft apart on an 8 foot×4 foot window at the entry points of connection to the SPD film.

Figure 20:
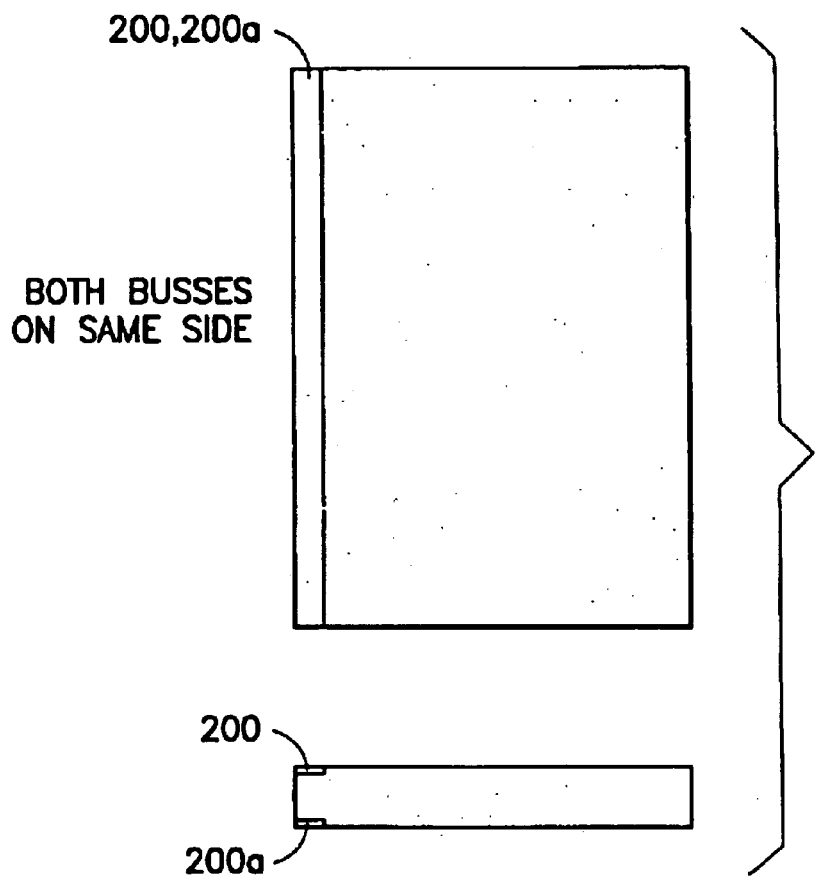
FIG. 20 is a diagram illustrating positioning of conducting busses on an SPD load according to an embodiment of the present application.
Figure 21:
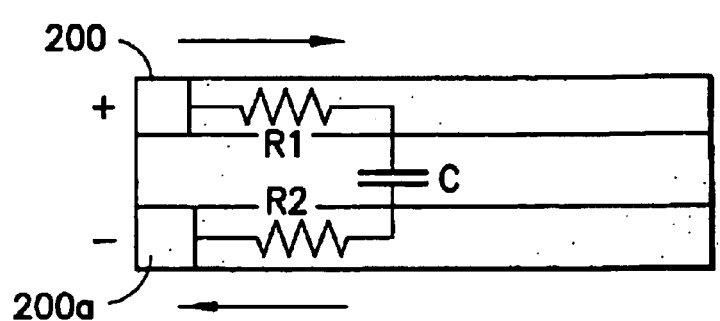
FIG. 21 is an RC equivalent circuit for the SPD load of FIG. 20.

The first bus improvement afforded by this invention is to locate busses, such as 200, 200a, on the same side of the SPD film or load, as shown in FIG. 20. In such an arrangement the entry connecting wires to the window are fractions of an inch apart, a decided advantage during installation. But this configuration will no longer guarantee a uniform response because the charging path for the different cells will be different as shown in FIG. 21. $R_1$ and $R_2$ will each be smaller when the differential capacitance is closer to the busses because fewer squares of resistance are in the charging path. This implies that the cells on the left receive more voltage than the cells on the right. In other words, the response becomes non-uniform. However, computer simulation and lumped-constant equivalent breadboards of an 8 ft×4 ft film with sheet resistance of 350 ohms per square and capacitance of 40 nF per square foot, and with busses on the longer and conventional 8 ft. sides demonstrating that the decrease in voltage moving from the bussed side to the unbussed side is less than 1 percent when operating at 60 Hz. As stated above, the human eye cannot detect changes in light transmission of less than 10 percent. Therefore, using busses on the same side produces a response that appears uniform to the human eye.

In another embodiment of the present invention, busses may be positioned on the shorter side rather than the longer side of rectangular SPD load. As discussed above, the only reason for using busses on the longer side was to minimize the number of squares in the charging path of each cellular capacitance. However, the power losses of currently available SPD film are so small compared to the power losses in controller circuits that busses on the shorter side produce a negligible decrease in the overall power efficiency of a combined controller-window device. Again, the proof that using the shorter bus is acceptable was to use both computer simulation and breadboards of an 8 ft×4 ft film with busses on the shorter and unconventional 4 ft sides. In this case, the decrease in cellular voltage from the bussed to the unbussed sides was less than 5 percent, too small for the eye to detect any non-uniformity in window transmission.

Another embodiment of the present invention uses very small busses, that is, rather than run a bus along as much as a 4-ft length, the bus is run along a much smaller length such as 1 inch or less. The bus length is not critical, so the use of 1 inch is not to be construed as essential for this invention. A larger or small bus may be used. In fact, bus lengths as small as 0.25 inches have proved to be entirely satisfactory in bread-boarded models. FIG. 22 shows the idea of using very small busses, 220, 220a, on the same side of the SPD film. The manufacturing advantages of this small-bus, same-side configuration are impressive because the hand labor in attaching the busses is almost eliminated. In addition to the manufacturing advantages, small busses on the same side have another advantage: they eliminate the need for an aesthetic covering that would be required with longer busses.

In FIG. 22, the worst-case response for cellular capacitance charging occurs for those cells in the upper right-hand corner because this is the greatest distance between the bus and the cell. Computer models and bread-boarded devices show that small busses on the same side are entirely satisfactory because the response is uniform to the human eye throughout the SPD film. Although the small busses, 220, 220a are shown in the lower left corner in FIG. 22, their location is not restricted. These busses can be located anywhere on the periphery. For instance, with an automobile window the small busses can be located on the bottom horizontal and the left or right vertical, as needed. The freedom to locate the small busses wherever convenient along the periphery is a decided installation advantage.

SPD loads that are movable or sliding present an additional wiring problem and are addressable by the present invention. With same-side small busses, such as 220, 220a, located at one corner of an SPD window, one can use retractable wiring that fits in the wall space. This is one approach that will allow AC power to be delivered to a sliding or movable SPD window.

FIG. 23 shows another embodiment of a voltage controlling device according to the present invention. In this embodiment at least one rechargeable battery 231 is used to provide electrical power for the SPD load. A group of miniature solar cells 232 convert solar energy into electrical energy. The typical solar cell produces a small voltage. By placing these solar cells in series, one can obtain a high enough voltage to charge one or more batteries. By using rechargeable batteries, power will be available on overcast days when it is most needed to keep the SPD windows in the clear state. The voltage out of the batteries is converted by the dc-to-ac converter 234 to produce the required AC voltage for the movable SPD window. Because the solar cells 232, at least one battery 231, and remaining electronics can be designed into the SPD window casing, there is no need to connect any external wires to the busses. In other words, the SPD window of this embodiment is self-powering.

In one embodiment of the invention, silicon solar cells are used. A typical silicon solar cell produces an output voltage of approximately 0.6 V. Output currents depend on the physical construction of the solar cell. Current may vary from less than 50 mA to more than 5 A. Since SPD windows require only small currents in the vicinity of 1 mA per square foot, one can use miniature solar cells in series to obtain higher voltage. For instance, with 15 silicon cells in series, the output voltage is 9 V, enough to charge a rechargeable 9-V battery. The dc-to-ac converter 234 may be an inverter of high efficiency to avoid excessive battery drain current. Alternatively, a Wien-bridge oscillator, a relaxation oscillator, or any other oscillator circuit plus a step-up transformer or inductive method of stepping up the voltage can be used. Furthermore, with SPD films of the future holding out the promise of much lower AC operating voltages, solar-powered SPD windows with simple electronics, very low cost, and high efficiency are likely to evolve.

A method of controlling voltage provided to a suspended particle device is described with reference to FIG. 24. In step S240, an AC voltage signal is received from an AC power source. At step S242, the AC voltage signal is divided into a plurality of distinct voltage levels within a predetermined range. At step S244, the dividing step is controlled to provide a selected voltage level of the plurality of distinct voltage levels to an SPD terminal connected to the suspended particle device based on voltage level information.

Figure 24:
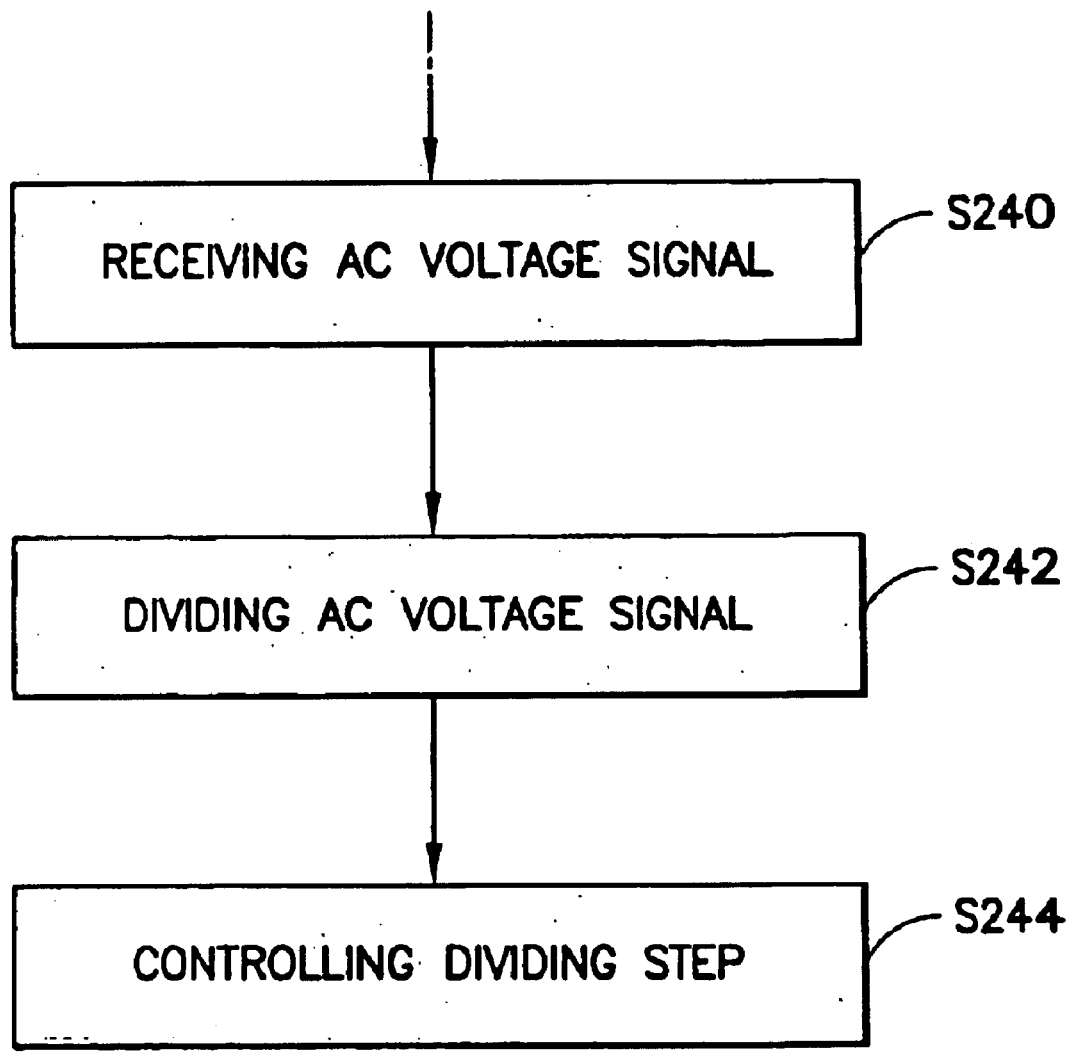
FIG. 24 is a flow chart illustrating a method of controlling voltage provided to a suspended particle device according to an embodiment of the present application.

The method of FIG. 24 is substantially similar to that utilized by voltage controlling device 50, for example, described herein, and therefore, there is no need to discuss the method in further detail.

Equations 10 through 13 imply a highly nonlinear response between SPD voltage and the manual adjustment used to control SPD tint. As a user manually adjusts the SPD voltage using the input device 57, for example, from 0 to maximum, the capacitance of the capacitor array varies linearly from 0 to maximum. However, the total capacitive reactance $X_T$ varies nonlinearly and contributes one level of nonlinearity to the response. Equations 10 through 13 further compound the nonlinearity by adding the interaction of the SPD capacitance $C_{spd}$ which varies with the SPD area. The resulting nonlinearity between the capacitor array 60 in FIG. 6 and the SPD load 55 produces large changes in SPD tint near the low end of the manual adjustment. That is to say, while the user attempts to adjust the tint of the SPD device using the tunable resistance preferably included in the input device 57 for example, the tint of the window changes drastically with only a small adjustment of the input device. Naturally, this makes it difficult for the user to properly adjust the tint of the window.

Figure 25:
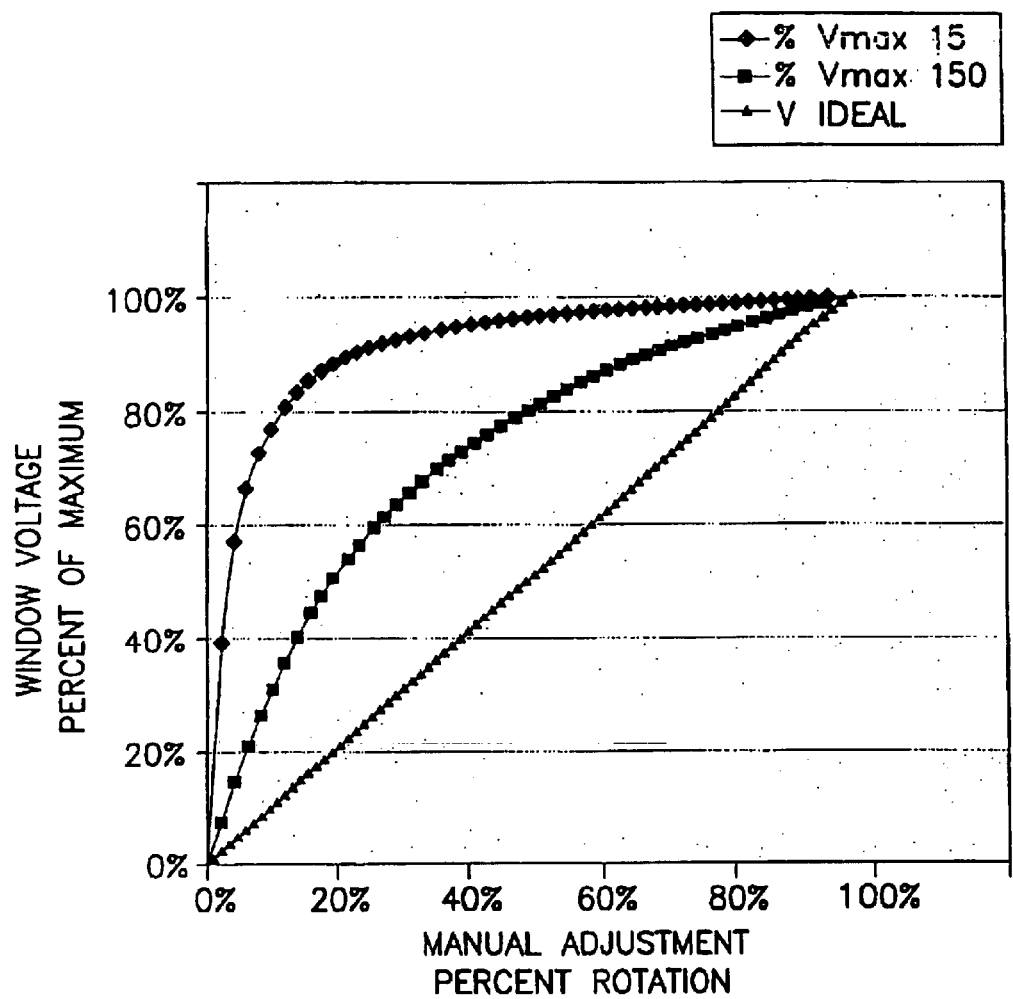
FIG. 25 is a graph illustrating a relationship between adjustment of voltage level information and the voltage provided to the SPD.

FIG. 25 illustrates the typical nonlinearity that occurs with SPD areas of 15 and 150 square feet, respectively. The top curve is the response with a SPD area of 15 square feet. As can be seen, the increase from the low end produces a rapid change in voltage, which implies a rapid change in SPD tint. This is far from desirable. Similarly, the middle curve for the SPD area of 150 square foot also shows rapid change but not of the same severity.

Ideally, a linear response as shown in the bottom curve is preferred. This linear response may be approximated by programming controller 56 properly. However, in order to linearize the response as shown by the bottom curve, we must know the SPD area, that is, the surface area of the SPD. Measuring the SPD area automatically when the power is initially applied to the control device 50 and storing this value in memory allows the controller 56 to then linearize the response for the measured SPD area.

Since the capacitance per square foot is fixed for a given SPD film type, the total capacitance of the SPD is predetermined at the time of installation. That is, the capacitance of a specific SPD is predetermined, and therefore automatically measuring the area of the SPD upon activation of the voltage controlling device 50 after installation provides the information necessary to optimize performance of the voltage controlling device 50.

Figure 26:
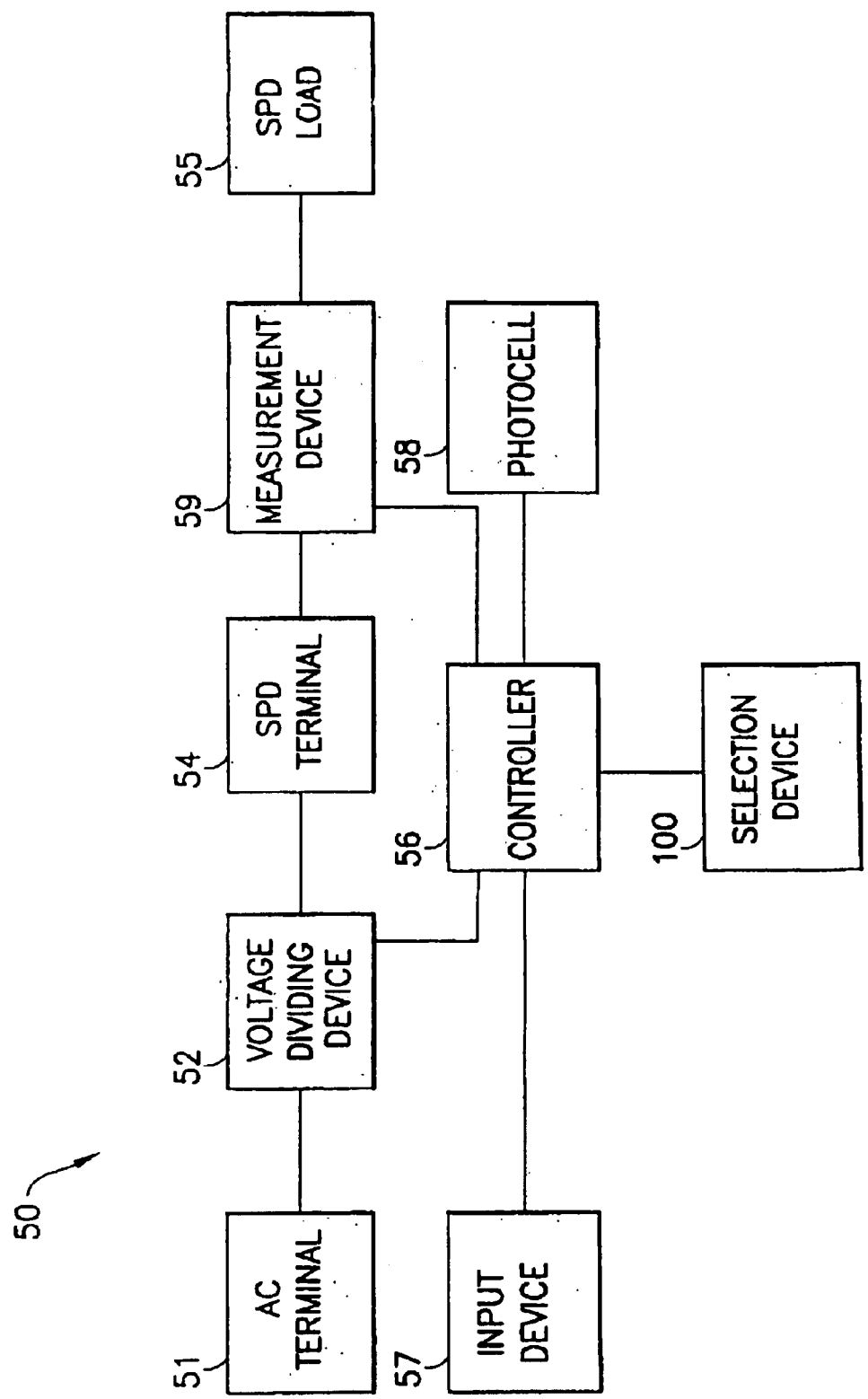
FIG. 26 is a block diagram illustrating a voltage control device according to tan embodiment of the present application.

An embodiment of a voltage controlling device 50 of the present invention is illustrated with reference to FIG. 26. The control device 50 of FIG. 26 is substantially the same as that described above with reference to FIG. 5. However, the control device of FIG. 26 includes measurement device 59 connected between the SPD terminal 54 and the SPD load 55. Alternatively, the measurement device 59 may be positioned between the voltage dividing device 52 and the SPD terminal 54 so long as it is in series with the SPD load 55. The measurement device provides information related to the area of the SPD, for use by the controller 56 to linearize or otherwise optimize the relationship between manual adjustment using the input device 57 and the SPD voltage.

The measurement device 59 may include a small current-sensing resistor (not shown) placed in series with the SPD. Preferably, at the time power is first applied to the control device, the controller 56 sets the capacitor array 60 to maximum capacitance. The interaction of the capacitor array 60 of the voltage dividing device 52 and the SPD determines the current through the current sensing resistor. The voltage drop across this resistor is a function of the SPD area. Therefore, the voltage drop across the resistor can be used to determine the area of the SPD. Preferably, the voltage drop information provided from the measurement device 59 is provided to the controller 56 via an A/D input, which converts the information into a digital equivalent for use by the controller. The controller 56 may then determine the SPD area. The area of the SPD is preferably stored in a memory of the controller 56.

Figure 27:
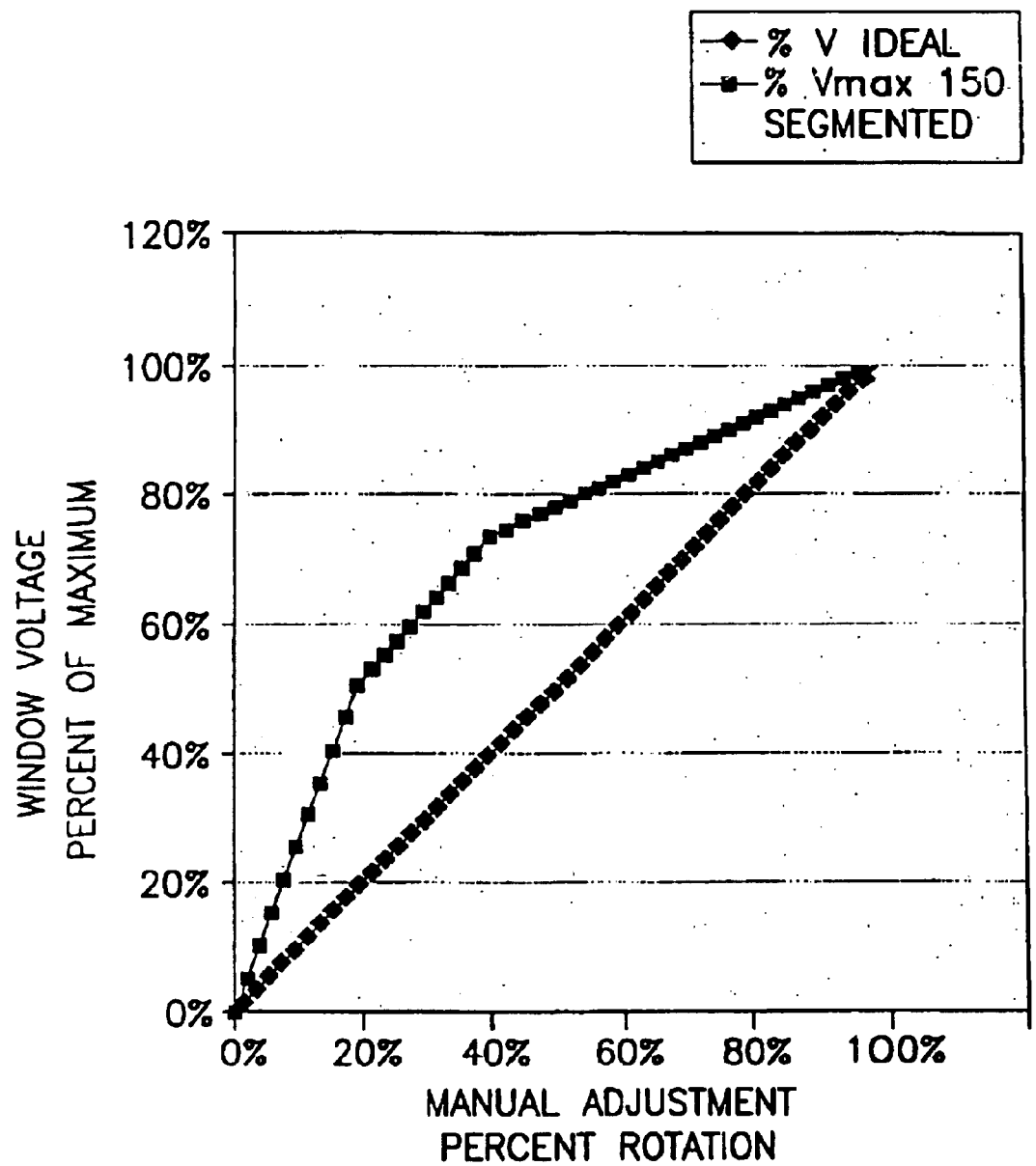
FIG. 27 is a graph illustrating an optimization of a relationship between adjustment of voltage level information and the voltage provided to the SPD.

The controller 56 may then linearize or otherwise optimize the relationship between manual adjustment and the SPD voltage. For example, to linearize the middle graph of FIG. 25, the graph may be segmented into linear portions to approximate the ideal linear response. FIG. 27 illustrates the foregoing idea in which the response for a 150 square foot SPD has been approximated by three linear segments. These three segments can be described by these three linear equations:

$$y=2.5x$$
$$y=50+(x-20)(73-50)/20$$
$$y=73+(x-40)(100-73)/60$$

The controller 56 can then change each segment above into a linear segment that falls closer to the ideal response of FIG. 27. That is, the controller 56 can control the voltage dividing device 52, such that the SPD voltage increases linearly. Thus, the original nonlinear response is more linear. Since the tolerance of the human eye to small changes in light transmission is rather large, the subjective effect on an observer is that the SPD voltage appears virtually linear as the SPD voltage is manually adjusted. More specifically, the tint of the window changes with the manual adjustment of the input device 57 in a more linear fashion. Of course, the more segments used, the better the approximation. The use of three linear segments is an example of a simple embodiment of the present application, however, any number of segments may be used, depending on the desired precision.

Figure 28:
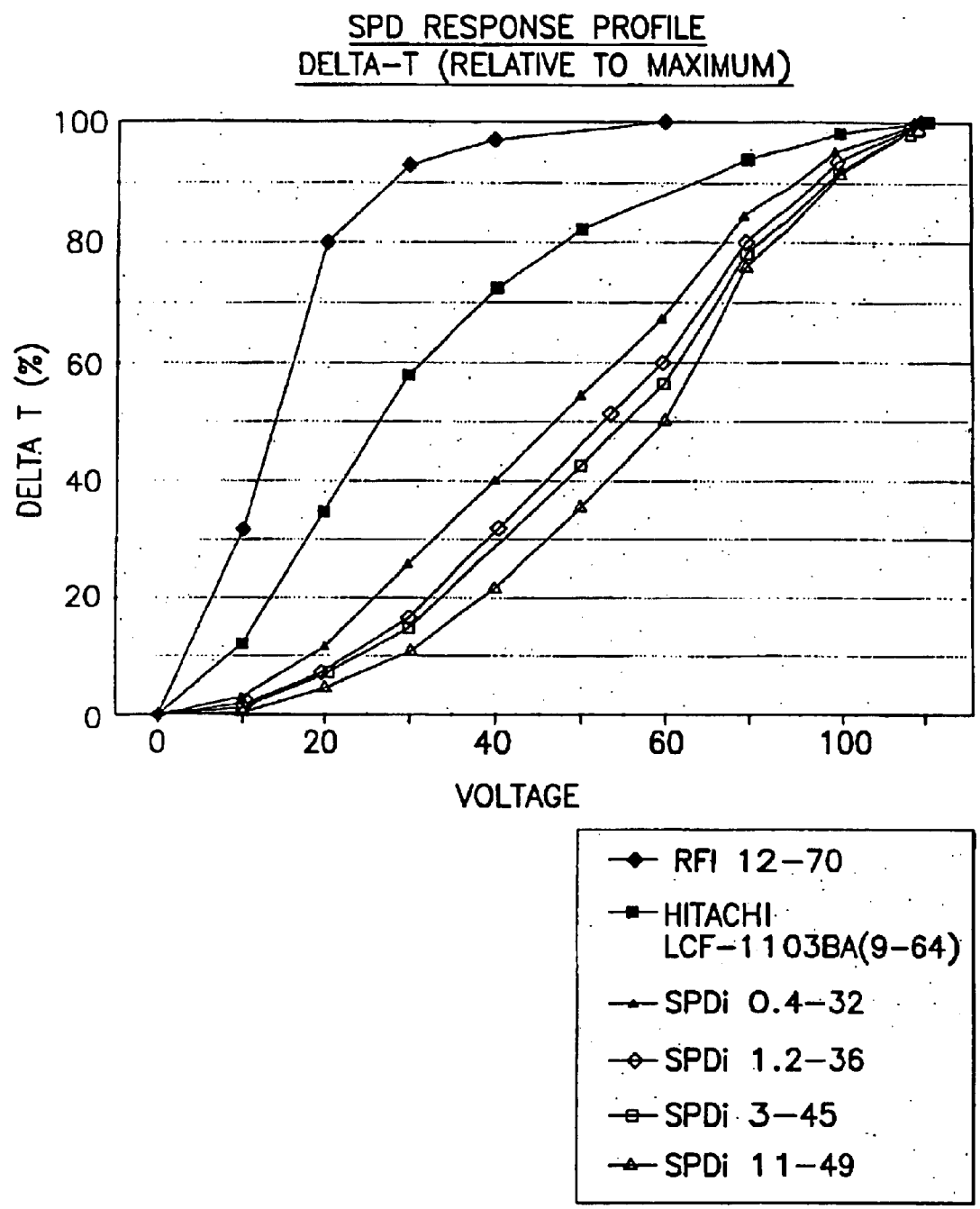
FIG. 28 is a graph illustrating the relationship between the change in transmission of light and the change in voltage applied to the SPD for various experimental SPD films.

As noted above, it is preferable that the control device be compatible with presently existing SPDs as well as with SPDs in the future that may use other SPD films. At this time considerable research and development is being carried out on SPD films. FIG. 28 shows the relationship between manual adjustment and SPD voltage of some of the SPD films that are undergoing lab development. The top curve is for an SPD film with a transmission range of 12 to 70 percent (film type RFI 12–70). Notice how its response differs from the next curve down with a transmission range of 11 to 49 percent (film type SPDi 11–49).

The variations of response for the film types introduce a different nonlinearity into the relation between light transmission and manual adjustment. The variation for any given film type can be linearized or otherwise optimized by the controller 56 based on instructions for that film type. That is, for any particular film type, the controller 56 may include programming to optimize the response. Selection information provided via selection device 100 (See FIG. 26) indicates which programming to be used for a particular film type. Naturally, the film type is known at the time of installation. Thus, the selection device preferably is embodied in a dual-in-line package switch ("DIP switch") preset either at the factory or preset by the installer of the voltage controlling device 50. During operation of the controller 56, the setting of the DIP switch acts as a pointer for the controller, indicating which type of film is in use so that the controller can control the voltage controlling device 50 in accordance with the correct instructions for the particular film. In this way, the voltage controlling device of the present application will allow for control both of SPD films commonly used today and be prepared for use with SPD films being developed as well.

The discussion above indicates the dangers posed to users when they provide an inadvertent path to ground from the SPD and the damage that the result current spike can due to humans. However, excessive current may also damage components of the voltage controlling device 50 as well. Furthermore, such excessive current may develop even where the user is not in danger, in which case the safety features discussed above will not stop the excessive current. That is, the components in the voltage controlling device 50 can be damaged by current overloads.

Typically, the most sensitive component of the voltage controlling device 50 is the switch-array 62 of FIG. 6. Thus, the voltage controlling device 50 of the present application preferably includes overload protection.

In a preferred embodiment, the SPD current is continuously sampled to ensure that it remains within acceptable limits. If at any time the SPD current exceeds a predetermined level caused by any malfunction, miswiring, short circuit, excessive window area, etc., the controller 56 preferably immediately reduces the capacitance of the capacitor array 60 to a low enough value to remove the overload.

According to one embodiment of a voltage controlling device including overload detection, the voltage drop information provided by the measurement device 59 of FIG. 26 is fed back the A/D converter input of the controller 56 in a manner similar to that described above. When the voltage drop information is converted to a digital number, the controller 56 determines whether an overload has occurred. That is, the voltage drop across the current sensing resistor of the measurement device 59 is related to the current passing through the resistor, and thus, the current passing through the voltage controlling device 50. If the voltage drop across the resistor exceeds a predetermined safe value, the controller controls the voltage dividing device 52 to reduce the SPD voltage to a safe value to prevent control device 50 from damage. Thus, measurement device 59 provides information to determine the area of the SPD and also provides information regarding the current flowing through the control device 50.

In a preferred embodiment, controller 56 preferably also includes a self-healing feature whereby the removal of the overload restores the control device 50 to normal operation. The self-healing can be a timer function, a recheck of overload, or some other method allowing the controller to return to normal operation after the overload is removed.

The absolute maximum current ratings of the components in the control device determine the absolute maximum SPD area that can be controlled. That is, the current limits of the components of the control device 50 will limit the maximum size of the SPD that it can safely control. Naturally, there is an engineering compromise between safety factors and performance. Thus, there may be a limit on the number of square feet that the control device may safely control.

In one embodiment, the engineering compromise is a controller that can control up to 150 square feet of SPD film where the capacitance of the SPD film is 40 pF per square foot.

Figure 29:
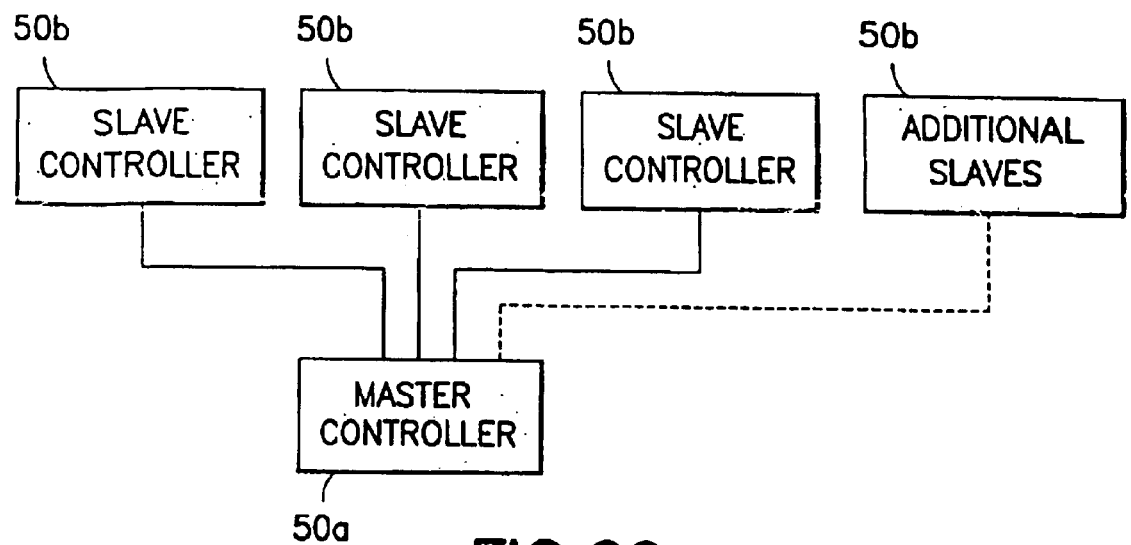
FIG. 29 is a block diagram illustrating a voltage controlling device according to an embodiment of the present application.

To control a larger window area, a master/slave method in which two or more slave voltage controlling devices, each controlling up to 150 square feet of SPD are used. As shown in FIG. 29, the master voltage controlling device 50a may control each of several slave voltage controlling devices 50b. In the current embodiment, each slave voltage controlling device 50b may control up to 150 square feet of SPD film. By adding more slaves, the master/slave system can control an unlimited SPD area.

In a preferred embodiment, the master control device 50a provides a dc voltage to the A/D converter generally used to connect the input device for manual adjustment of the slave control device 50b. Alternatively, a digital signal instructing the slave control device to control the SPD to provide a precise amount of light transmission may be provided to the slave control device 50b via an 8-bit port (not shown), for example. In either case, the control information provided by the master voltage controlling device determines how the slave voltage controlling device or devices control the slave voltage dividing devices to provide selected voltage values to the slave SPD terminals. The advantage of such a system includes the use of each slave control device 50b as a node that can sample environmental data and feed it back to the master control device 50a for more processing.

A method of controlling voltage provided to a suspended particle device is described with reference to FIG. 30. In step S300, an AC voltage signal is received from an AC power source. At step S302, the AC voltage signal is divided into a plurality of distinct voltage levels within a predetermined range. At step S304, measurement information related to the surface area of the SPD is determined. At step S306, the dividing step is controlled to provide a selected voltage level of the plurality of distinct voltage levels to an SPD terminal connected to the suspended particle device based on voltage level information and the measurement information.

Figure 30:
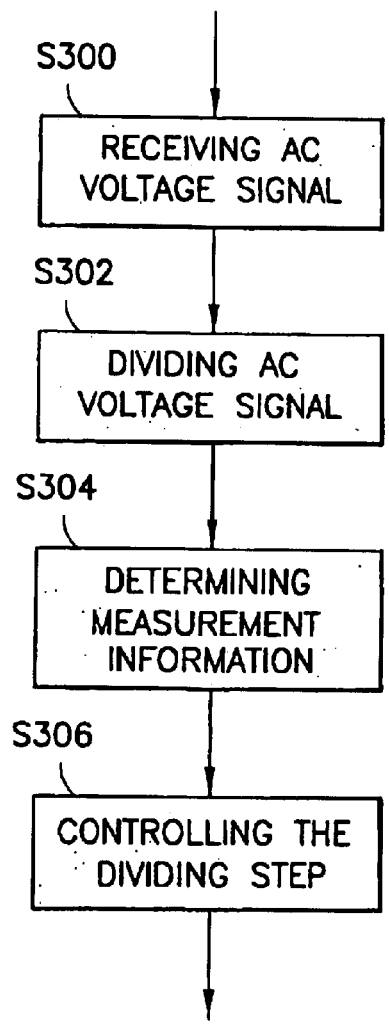
FIG. 30 is a flow chart illustrating a method of controlling voltage provided to a suspended particle device according to an embodiment of the present application.

The method of FIG. 30 is substantially similar to that utilized by voltage controlling device 50, for example, described herein with reference to FIG. 26, and therefore, there is no need to discuss the method in further detail.

Numerous additional modifications and variations of the present invention are possible in view of the above-teachings. It is therefore to be understood that within the scope of the appended claims, the present invention may be practiced other than as specifically described herein.

Each of the patents and other references noted herein is incorporated into the present specification to the degree necessary to comprehend the invention.

What is claimed is:

1. A voltage controlling device for controlling voltage provided to at least one suspended particle device (SPD) which comprises:
   an AC terminal adapted to receive an AC voltage at a specific frequency;
   a voltage dividing device adapted to divide the AC voltage into a plurality of distinct voltage values within a predetermined range;
   a measurement device adapted to provide measurement information related to the surface area of the SPD;
   a controller adapted to control the voltage dividing device to provide a selected voltage value based on voltage level information and the measurement information; and
   an SPD terminal adapted to provide the selected voltage value to the SPD.

2. The voltage controlling device of claim 1, wherein the voltage dividing device further comprises:
   a capacitor array including a plurality of capacitors where each capacitor in the capacitor array has a predetermined capacitance; and
   a switch array, connecting each capacitor of the capacitor array to the SPD terminal such that each switch of the switch array connects one capacitor of the capacitor array to the SPD terminal, wherein
   the controller controls the switches of the switch array to connect at least one of the capacitors of the capacitor array to the SPD terminal based on the voltage level information and the measurement information.

3. The voltage controlling device of claim 2, further comprising an input device adapted to allow a user to input and adjust the voltage level information.

4. The voltage controlling device of claim 3, wherein the measurement device is connected electrically in series with the SPD terminal.

5. The voltage controlling device of claim 4, wherein the measurement device further comprises a current sensing resistor providing voltage drop information regarding a voltage drop across the current sensing resistor.

6. The voltage controlling device of claim 5, wherein the controller determines the surface area of the SPD based on the voltage drop information.

7. The voltage controlling device of claim 6, wherein the controller stores information related to a relationship between adjustments of the voltage level information made via the input device and the selected voltage level for SPDs having a plurality of different surface areas.

8. The voltage controlling device of claim 7, wherein the controller optimizes the relationship between the adjustments of the voltage level information made via the input device and the selected voltage level provided to the SPD terminal based on the determined surface area of the SPD.

9. The voltage controlling device of claim 8, wherein the controller linearizes the relationship between the adjustments made via the voltage level information and the selected voltage level provided to the SPD terminal such that as the user adjusts the voltage level information via the input device, the selected voltage level supplied to the SPD terminal changes in a substantially linear fashion.

10. The voltage controlling device of claim 9, wherein the controller receives the measurement information from at least one slave voltage controlling device and provides control information to a slave controller of the slave voltage controlling device based on the voltage level information and the measurement information from the slave voltage controlling device.

11. The voltage controlling device of claim 10, wherein the controller stores relationship information regarding the relationship between adjustments made to the voltage level information made by the user via the input device and the selected voltage supplied to the SPD terminal for a plurality of different types of SPDs.

12. The voltage controlling device of claim 11, wherein the controller optimizes the relationship between adjustments made to the voltage level information made by the user via the input device and the selected voltage supplied to the SPD terminal based on selection information indicating an SPD type.

13. The voltage controlling device of claim 12, wherein the selection information is provided by the user utilizing a selection device.

14. The voltage controlling device of claim 13, wherein the selection device is set in advance utilizing the selection device.

15. The voltage controlling device of claim 5, wherein the controller controls the switch array to disconnect at least one capacitor of the capacitor array from the SPD terminal when the voltage drop information indicates that the voltage drop across the current sensing resistor is above a predetermined level.

16. The voltage controlling device of claim 15, wherein the controller reconnects the at least one capacitor of the capacitor array to the SPD terminal after a predetermined period of time has passed.

17. The voltage controlling device of claim 16, wherein the controller reconnects the at least one capacitor of the capacitor array to the SPD terminal when the voltage drop information indicates that the voltage drop across the current sensing resistor is below the predetermined level.

18. The voltage controlling device of claim 17, wherein the controller receives the measurement information from at least one slave voltage controlling device and provides control information to a slave controller of the slave voltage controlling device based on the voltage level information and the measurement information from the slave voltage controlling device.

19. A method of controlling voltage provided to a suspended particle device (SPD), which method comprises:
   receiving an AC voltage at a specific frequency;

dividing the AC voltage into a plurality of distinct voltage values within a predetermined range using a voltage dividing device;

determining measurement information related to the surface area of the SPD using a measurement device;

controlling the voltage dividing device to provide a selected voltage value based on voltage level information and the measurement information; and providing the selected voltage value to an SPD terminal connected to the SPD.

20. The method of claim 19, wherein the dividing step further comprises:

providing a capacitor array including a plurality of capacitors, where each capacitor in the capacitor array has a predetermined capacitance; and connecting each capacitor of the capacitor array to the SPD terminal via a switch array, such that each switch of the switch array connects one capacitor of the capacitor array to the SPD terminal, wherein the switch array is controlled such that switches of the switch array connect at least one of the capacitors of the capacitor array to the SPD terminal based on voltage level information and the measurement information.

21. The method of claim 20, which method further comprises allowing a user to input and adjust the voltage level information utilizing an input device.

22. The method of claim 21, wherein the measurement device is connected electrically in series with the SPD terminal.

23. The method of claim 22, which method further comprises receiving voltage drop information from a current sensing resistor of the measurement device, where the voltage drop information indicates a voltage drop across the current sensing resistor.

24. The method of claim 23, wherein the controlling step further comprises calculating a surface area of the SPD based on the voltage drop information.

25. The method of claim 24, wherein the controlling step further comprises storing relationship information related to a relationship between adjustment of the voltage level information made via the input device and the selected voltage level provided to the SPD terminal for SPDs having a plurality of different surface areas.

26. The method of claim 25, wherein the controlling step further comprises optimizing the relationship between the adjustment of the voltage level information made via the input device and the selected voltage level provided to the SPD terminal based on the determined surface area of the SPD.

27. The method of claim 26, wherein the controlling step further comprises linearizing the relationship between the adjustment made via the voltage level information and the selected voltage level provided to the SPD terminal, such that, as the user adjusts the voltage level information via the input device, the selected voltage level supplied to the SPD terminal changes in a substantially linear fashion.

28. The method of claim 27, wherein the controlling step further comprises receiving measurement information from at least one slave voltage controlling device and providing control information to a slave controller of the slave voltage controlling device based on the voltage level information and the measurement information from the slave voltage controlling device.

29. The method of claim 28, wherein the controlling step further comprises storing relationship information regarding the relationship between adjustment of the voltage level information made by the user via the input device and the selected voltage supplied to the SPD terminal for a plurality of different types of SPDs.

30. The method of claim 29, wherein the controlling step further comprises optimizing the relationship between adjustment to the voltage level information made by the user via the input device and the selected voltage supplied to the SPD terminal based on selection information indicating an SPD type.

31. The method of claim 30, wherein the selection information is provided by the user utilizing a selection device.

32. The method of claim 31, wherein the selection information is provided in advance and stored.

33. The method of claim 23, wherein the controlling step further comprises disconnecting at least one capacitor of the capacitor array from the SPD terminal when the voltage drop information indicates that the voltage drop across the current sensing resistor is above a predetermined level.

34. The method of claim 33, wherein the controlling step further comprises reconnecting the at least one capacitor of the capacitor array to the SPD terminal after a predetermined period of time has passed.

35. The method of claim 34, wherein the controlling step further comprises reconnecting the at least one capacitor of the capacitor array to the SPD terminal when the voltage drop information indicates that the voltage drop across the current sensing resistor is below the predetermined level.

36. The method of claim 35, wherein the controlling step further comprises receiving measurement information from at least one slave voltage controlling device and providing control information to a slave controller of the slave voltage controlling device based on the voltage level information and the measurement information from the slave voltage controlling device.

37. A voltage controlling device for controlling voltage provided to at least one suspended particle device (SPD) which comprises:

an AC terminal adapted to receive an AC voltage at a specific frequency;

a voltage dividing device adapted to divide the AC voltage into a plurality of distinct voltage values within a predetermined range;

a measurement device adapted to provide measurement information related to the surface area of the SPD;

a controller adapted to control the voltage dividing device to provide a selected voltage value based on voltage level information and the measurement information, wherein the controller optimizes a relationship between adjustments to the voltage level information and the selected voltage value; and an SPD terminal adapted to provide the selected voltage value to the SPD.

38. A method of controlling voltage provided to a suspended particle device (SPD), which method comprises:

receiving an AC voltage at a specific frequency;

dividing the AC voltage into a plurality of distinct voltage values within a predetermined range using a voltage dividing device;

determining measurement information related to the surface area of the SPD using a measurement device;

controlling the voltage dividing device to provide a selected voltage value based on voltage level information and the measurement information and optimizing a relationship between adjustments made to the voltage level information and the selected voltage value; and providing the selected voltage value to an SPD terminal connected to the SPD.

39. A voltage controlling device for controlling voltage provided to at least one suspended particle device (SPD) which comprises:
- an AC terminal adapted to receive an AC voltage at a specific frequency;
- a voltage dividing device adapted to divide the AC voltage into a plurality of distinct voltage values within a predetermined range;
- a measurement device adapted to provide measurement information related to the surface area of the SPD, wherein the measurement device includes a current sensing resistor providing voltage drop information indicating a voltage drop across the current sensing resistor;
- a controller adapted to control the voltage dividing device to provide a selected voltage value based on voltage level information and the measurement information, wherein the controller controls the voltage dividing device to reduce the selected voltage value when the voltage drop information is above a predetermined level; and
- an SPD terminal adapted to provide the selected voltage value to the SPD.

40. A method of controlling voltage provided to a suspended particle device (SPD), which method comprises:
- receiving an AC voltage at a specific frequency;
- dividing the AC voltage into a plurality of distinct voltage values within a predetermined range using a voltage dividing device;
- determining measurement information related to the surface area of the SPD using a measurement device and including voltage drop information indicating a voltage drop across a current sensing resistor;
- controlling the voltage dividing device to provide a selected voltage value based on voltage level information and the measurement information, wherein the selected voltage value is reduced when the voltage drop information is above a predetermined level; and
- providing the selected voltage value to an SPD terminal connected to the SPD.

41. A voltage controlling device for controlling voltage provided to at least one suspended particle device (SPD) which comprises:
- an AC terminal adapted to receive an AC voltage at a specific frequency;
- a voltage dividing device adapted to divide the AC voltage into a plurality of distinct voltage values within a predetermined range;
- a measurement device adapted to provide measurement information related to the surface area of the SPD, wherein the measurement device includes a current sensing resistor providing voltage drop information indicating a voltage drop across the current sensing resistor;
- a controller adapted to control the voltage dividing device to provide a selected voltage value based on voltage level information and the measurement information, wherein the controller optimizes a relationship between adjustments to the voltage level information and the selected voltage value, and further controls the voltage dividing device to reduce the selected voltage value when the voltage drop information is above a predetermined level; and
- an SPD terminal adapted to provide the selected voltage value to the SPD.

42. A method of controlling voltage provided to a suspended particle device (SPD), which method comprises:
- receiving an AC voltage at a specific frequency;
- dividing the AC voltage into a plurality of distinct voltage values within a predetermined range using a voltage dividing device;
- determining measurement information related to the surface area of the SPD using a measurement device and including voltage drop information indicating a voltage drop across a current sensing resistor;
- controlling the voltage dividing device to provide a selected voltage value based on voltage level information and the measurement information, wherein a relationship between adjustments made to the voltage level information and the selected voltage value is optimized and wherein the selected voltage value is reduced when the voltage drop information is above a predetermined level; and
- providing the selected voltage value to an SPD terminal connected to the SPD.

* * * * *